US008571401B2

(12) United States Patent
Clark

(10) Patent No.: US 8,571,401 B2
(45) Date of Patent: Oct. 29, 2013

(54) SYSTEMS AND METHODS FOR CHANGING POWER STATES OF A REMOTE DEVICE USING ONE OR MORE CAMERA BODY CONTROLS AND A PRESET DELAY

(71) Applicant: Lab Partners Associates, Inc., South Burlington, VT (US)

(72) Inventor: James E. Clark, South Burlington, VT (US)

(73) Assignee: Lab Partners Associates, Inc., Souh Burlington, VT (US)

( * ) Notice: Subject to any disclaimer, the term of this patent is extended or adjusted under 35 U.S.C. 154(b) by 0 days.

(21) Appl. No.: 13/692,515

(22) Filed: Dec. 3, 2012

(65) Prior Publication Data

US 2013/0089313 A1    Apr. 11, 2013

Related U.S. Application Data

(63) Continuation of application No. 12/705,052, filed on Feb. 12, 2010, now Pat. No. 8,326,141.

(60) Provisional application No. 61/151,876, filed on Feb. 12, 2009.

(51) Int. Cl.
G03B 15/06 (2006.01)
G03B 15/04 (2006.01)

(52) U.S. Cl.
USPC .................. 396/56; 396/4; 396/164; 348/370

(58) Field of Classification Search
USPC .................. 396/4, 56–58, 280, 299, 301–303; 348/370
See application file for complete search history.

(56) References Cited

U.S. PATENT DOCUMENTS 3,039,375 A   6/1962  Umbach
3,185,056 A   5/1965  Gold et al.
3,205,803 A   9/1965  Burgarella et al.
(Continued)

FOREIGN PATENT DOCUMENTS

CA          2616030        1/2013
CN    2007/80020420.4     6/2010
(Continued)

OTHER PUBLICATIONS

Profoto Pro-B2 User's manual, dated 2005.*

(Continued)

Primary Examiner — Clayton E LaBalle
Assistant Examiner — Leon W Rhodes, Jr.
(74) Attorney, Agent, or Firm — Downs Rachlin Martin PLLC

(57) ABSTRACT

A control system for controlling power states of a controlled device, such as a lighting device, a special effects device and an in-scene device, in a photographic image-acquisition setting. The control system is configured to detect one or more camera body signals generated as a function of actuation of one or more camera body controls by a user. The control system generates a first power state change signal in response to the detected camera body signal(s) and transmits the power state change signal to the remote device so as to cause the remote device to operate at a first power state. The control system also implements a preset delay and causes the remote device to change from the first power state to a second power state in response to expiration of the preset delay.

33 Claims, 12 Drawing Sheets

(56) References Cited

U.S. PATENT DOCUMENTS

| | | |
|---|---|---|
| 3,259,042 A | 7/1966 | Kagan |
| RE26,627 E | 7/1969 | Burgarella et al. |
| 3,659,509 A | 5/1972 | Burgarella |
| 3,728,947 A | 4/1973 | Harnden et al. |
| 3,782,258 A | 1/1974 | Boekkooi et al. |
| 3,810,214 A | 5/1974 | Malone et al. |
| 4,047,191 A | 9/1977 | Coppa et al. |
| 4,194,818 A | 3/1980 | Matteson et al. |
| 4,201,434 A | 5/1980 | Tureck |
| 4,209,244 A | 6/1980 | Sahara et al. |
| 4,333,719 A | 6/1982 | Takami et al. |
| 4,344,680 A | 8/1982 | Ishida et al. |
| 4,351,594 A | 9/1982 | Ishida et al. |
| 4,355,309 A | 10/1982 | Hughey et al. |
| 4,482,895 A | 11/1984 | Weinberg |
| 4,509,845 A | 4/1985 | Mizokami |
| 4,571,049 A | 2/1986 | Tsunefuji et al. |
| 4,573,786 A | 3/1986 | Taniguchi et al. |
| 4,603,954 A | 8/1986 | Egawa et al. |
| 4,636,052 A | 1/1987 | Bowsher |
| 4,643,551 A | 2/1987 | Ohmori |
| 4,693,582 A | 9/1987 | Kawamura et al. |
| 4,740,804 A | 4/1988 | Shands |
| 4,816,850 A | 3/1989 | Phillipeaux et al. |
| 4,816,855 A | 3/1989 | Kitaura et al. |
| 4,884,094 A | 11/1989 | Kitaura et al. |
| 4,988,584 A | 1/1991 | Shaper |
| 5,016,037 A | 5/1991 | Taniguchi et al. |
| 5,159,375 A | 10/1992 | Taniguchi et al. |
| 5,283,610 A | 2/1994 | Sasaki |
| 5,299,012 A | 3/1994 | Tsuruta et al. |
| 5,359,375 A | 10/1994 | Clark |
| 5,384,611 A | 1/1995 | Tsuji et al. |
| 5,422,543 A | 6/1995 | Weinberg |
| 5,436,531 A | 7/1995 | Weinberg |
| 5,521,708 A | 5/1996 | Beretta |
| 5,640,623 A | 6/1997 | Sasaki |
| 5,692,223 A | 11/1997 | Ichikawa et al. |
| 5,708,833 A | 1/1998 | Kinney et al. |
| 5,721,971 A | 2/1998 | Sasaki |
| 5,734,934 A | 3/1998 | Horinishi et al. |
| 5,754,898 A | 5/1998 | Nakano |
| 5,848,306 A | 12/1998 | Shono |
| 6,006,039 A | 12/1999 | Steinberg et al. |
| 6,029,013 A | 2/2000 | Larkin et al. |
| 6,052,539 A | 4/2000 | Latorre |
| 6,088,542 A | 7/2000 | Yanai et al. |
| 6,127,940 A | 10/2000 | Weinberg |
| 6,167,199 A | 12/2000 | Fukui |
| 6,278,481 B1 | 8/2001 | Schmidt |
| 6,351,610 B1 | 2/2002 | Numako et al. |
| 6,353,711 B1 | 3/2002 | Numako et al. |
| 6,366,737 B1 | 4/2002 | Numako et al. |
| 6,400,907 B1 | 6/2002 | Izukawa |
| 6,404,987 B1 | 6/2002 | Fukui |
| 6,430,369 B2 | 8/2002 | Lee et al. |
| 6,453,154 B1 | 9/2002 | Haber et al. |
| 6,524,237 B1 | 2/2003 | McGowan |
| 6,618,557 B1 | 9/2003 | Ziemkowski |
| 6,625,399 B1 | 9/2003 | Davis |
| 6,683,654 B1 | 1/2004 | Haijima |
| 6,718,135 B2 | 4/2004 | Kawasaki et al. |
| 6,731,952 B2 | 5/2004 | Schaeffer et al. |
| 6,748,165 B2 | 6/2004 | Ogasawara |
| 6,778,764 B2 | 8/2004 | Barghini et al. |
| 6,798,986 B2 | 9/2004 | Hagiuda |
| 6,941,067 B2 | 9/2005 | Muramatsu |
| 7,016,603 B2 | 3/2006 | Clark |
| 7,035,534 B2 | 4/2006 | Shih et al. |
| 7,133,607 B2 | 11/2006 | Clark |
| 7,184,658 B2 | 2/2007 | Squillace |
| 7,362,965 B2 | 4/2008 | Clark |
| 7,437,063 B2 | 10/2008 | Clark |
| 7,446,800 B2 | 11/2008 | Holmes |
| 7,463,304 B2 | 12/2008 | Murray |
| 7,684,692 B2 | 3/2010 | Kashiyama |
| 7,702,228 B2 | 4/2010 | Clark |
| 7,714,908 B2 | 5/2010 | Holmes |
| 7,764,875 B2 | 7/2010 | Clark |
| 7,775,575 B2 | 8/2010 | Clark |
| 7,783,188 B2 | 8/2010 | Clark |
| 7,834,894 B2 | 11/2010 | Swanson et al. |
| 7,877,005 B2 | 1/2011 | Okubo |
| 7,880,761 B2 | 2/2011 | Clark |
| 7,885,533 B2 | 2/2011 | Clark |
| 7,965,335 B2 | 6/2011 | Niblock |
| 7,969,504 B2 | 6/2011 | Matsuda et al. |
| 7,970,267 B1 | 6/2011 | Clark |
| 8,116,620 B2 | 2/2012 | King |
| 8,116,621 B2 | 2/2012 | King |
| 8,121,468 B2 | 2/2012 | Clark |
| 8,130,276 B2 | 3/2012 | Holmes |
| 8,134,576 B2 | 3/2012 | Swanson et al. |
| 8,180,210 B2 | 5/2012 | Clark |
| 8,326,136 B1 | 12/2012 | Clark |
| 8,326,140 B1 | 12/2012 | Clark |
| 8,326,141 B1 | 12/2012 | Clark |
| 8,331,776 B2 | 12/2012 | Clark |
| 8,351,774 B2 | 1/2013 | Clark |
| 2001/0042149 A1 | 11/2001 | Ito et al. |
| 2002/0009296 A1 | 1/2002 | Shaper et al. |
| 2002/0013161 A1 | 1/2002 | Schaeffer et al. |
| 2002/0067425 A1 | 6/2002 | Iverson |
| 2002/0067923 A1 | 6/2002 | Fujimura |
| 2003/0128272 A1 | 7/2003 | Clough et al. |
| 2003/0133018 A1 | 7/2003 | Ziemkowski |
| 2003/0193588 A1 | 10/2003 | Yuen et al. |
| 2004/0036774 A1 | 2/2004 | Nichols et al. |
| 2005/0006484 A1 | 1/2005 | Ito |
| 2005/0174434 A1 | 8/2005 | Chang et al. |
| 2006/0014563 A1 | 1/2006 | Cheng |
| 2006/0216009 A1 | 9/2006 | Kawamura |
| 2006/0275024 A1 | 12/2006 | McNary |
| 2006/0291016 A1 | 12/2006 | Ishigami et al. |
| 2008/0180531 A1 | 7/2008 | Sekiguchi |
| 2009/0129765 A1 | 5/2009 | King |
| 2009/0135262 A1 | 5/2009 | Ogasawara |
| 2009/0278479 A1 | 11/2009 | Platner et al. |
| 2009/0310012 A1 | 12/2009 | Ueda et al. |
| 2010/0158494 A1 | 6/2010 | King |
| 2010/0177212 A1 | 7/2010 | Holmes |
| 2010/0202767 A1 | 8/2010 | Shirakawa |
| 2010/0209089 A1 | 8/2010 | King |
| 2011/0001665 A1 | 1/2011 | King |
| 2011/0119409 A1 | 5/2011 | King |
| 2011/0128390 A1 | 6/2011 | Clark |
| 2011/0129207 A1 | 6/2011 | King et al. |
| 2011/0167008 A1 | 7/2011 | King |
| 2012/0099847 A1 | 4/2012 | Clark |
| 2012/0120281 A1 | 5/2012 | Swanson et al. |
| 2012/0127340 A1 | 5/2012 | Holmes |
| 2012/0127361 A1 | 5/2012 | Clark |
| 2012/0140088 A1 | 6/2012 | Clark |
| 2012/0181948 A1 | 7/2012 | Clark |
| 2012/0194699 A1 | 8/2012 | Kouno |
| 2012/0207459 A1 | 8/2012 | Clark |
| 2012/0207460 A1 | 8/2012 | Clark |
| 2012/0243859 A1 | 9/2012 | Clark |
| 2013/0089313 A1 | 4/2013 | Clark |
| 2013/0094845 A1 | 4/2013 | Clark |
| 2013/0100340 A1 | 4/2013 | Clark |

FOREIGN PATENT DOCUMENTS

| | | |
|---|---|---|
| CN | 2010-10600736.4 | 2/2012 |
| CN | 2010-10600736.4 | 12/2012 |
| EP | 0984320 A | 3/2000 |
| EP | 07760263.9 | 1/2011 |
| EP | 07760263.9 | 7/2011 |
| EP | 8756458.9 | 7/2011 |
| EP | 11177995.5 | 12/2011 |
| EP | 11177995.5 | 7/2012 |
| EP | 10741797 | 8/2012 |
| EP | 11177995.5 | 8/2012 |

(56) References Cited

FOREIGN PATENT DOCUMENTS

| | | |
|---|---|---|
| EP | 11177997.1 | 12/2012 |
| JP | 56-143422 | 11/1981 |
| JP | 59-064821 A | 4/1984 |
| JP | 59-170822 | 9/1984 |
| JP | 63-018874 | 1/1988 |
| JP | 05-093948 | 4/1993 |
| JP | 2002-244193 A | 8/2002 |
| JP | 2002-318413 | 10/2002 |
| JP | 2003-172970 A | 6/2003 |
| JP | 2003-215672 A | 7/2003 |
| JP | 2003-325451 | 11/2003 |
| JP | 2004-072230 | 3/2004 |
| JP | 2006-149935 | 6/2006 |
| JP | 2007-067870 A | 3/2007 |
| JP | 2010-510491 | 8/2012 |
| KR | 10-0728117 | 6/2007 |
| WO | 9638925 A1 | 12/1996 |
| WO | PCT/US03/037271 | 5/2004 |
| WO | 2004049057 A1 | 6/2004 |
| WO | 2007012041 A2 | 1/2007 |
| WO | 2007118201 A2 | 10/2007 |
| WO | PCT/US2007/066162 | 11/2007 |
| WO | PCT/US2006/028229 | 2/2008 |
| WO | PCT/US2008/065137 | 9/2008 |
| WO | PCT/US2008/065139 | 9/2008 |
| WO | 2008150902 A1 | 12/2008 |
| WO | 2008150904 A1 | 12/2008 |
| WO | PCT/US2010/024088 | 7/2010 |
| WO | 2010093914 A1 | 8/2010 |
| WO | 2010093927 A1 | 8/2010 |
| WO | 2010093994 A1 | 8/2010 |
| WO | PCT/US2010/024108 | 9/2010 |
| WO | PCT/US2010/024195 | 9/2010 |
| WO | PCT/US2011/044008 | 11/2011 |
| WO | 2012009537 A1 | 1/2012 |
| WO | PCT/US2012/025915 | 6/2012 |
| WO | 2012161772 A1 | 11/2012 |

OTHER PUBLICATIONS

U.S. Appl. No. 12/705,052, Mar. 27, 2012, Office Action, 8,326,141.
U.S. Appl. No. 12/705,052, Jun. 27, 2012, Response to Office Action, 8,326,141.
U.S. Appl. No. 12/705,052, Sep. 5, 2012, Notice of Allowance, 8,326,141.
U.S. Appl. No. 12/705,096, Mar. 12, 2012, Office Action, 8,326,136.
U.S. Appl. No. 12/705,096, Jun. 12, 2012, Response to Office Action, 8,326,136.
U.S. Appl. No. 12/705,096, Aug. 8, 2012, Notice of Allowance, 8,326,136.
U.S. Appl. No. 12/705,164, Mar. 29, 2012, Office Action.
U.S. Appl. No. 12/705,164, Jun. 29, 2012, Response to Office Action.
U.S. Appl. No. 12/405,164, Sep. 7, 2012, Office Action.
U.S. Appl. No. 12/705,164, Nov. 29, 2012, RCE.
U.S. Appl. No. 13/692,515, filed Dec. 3, 2012.
U.S. Appl. No. 13/692,550, filed Dec. 3, 2012.
U.S. Appl. No. 12/705,164, filed Feb. 12, 2010.
Nikon D80 User's Manual; see "Modeling Flash," p. 98; published on Aug. 11, 2006.
U.S. Appl. No. 13/735,325, Mar. 15, 2013, Office Action.
U.S. Appl. No. 13/735,325, Mar. 21, 2013, Response to Office Action w/Terminal Disclaimers.
U.S. Appl. No. 13/708,326, Mar. 26, 2013, Notice of Allowance.
U.S. Appl. No. 13/207,706, Mar. 26, 2013, Response to Office Action.
U.S. Appl. No. 13/016,345, Apr. 26, 2013, Restriction Requirement.
U.S. Appl. No. 13/181,046, Apr. 29, 2013, Response to Office Action.
Affadavit of James E. Clark: FlashWizard II Synchronizer, signed Mar. 20, 2008; previously submitted in U.S. Appl. No. 11/697,241.
Analog Devices Technical Data Sheet for ADF7020-1 Transceiver IC, Analog Devices, Inc., 2005, pp. 1-44.
ASH Transceiver Impedance Matching; Document Created on Dec. 10, 2001; pp. 1 to 10; http://www.rfm.com/products/apnotes/aten-namatch.pdf; last viewed on Dec. 15, 2005.
Canon EOS 40D Usuer's Manual; about Sep. 2007 Canon Corporation.
Declaration of James E. Clark filed on Feb. 18, 2005 in U.S. Appl. No. 10/306,759.
Ken Rockwell; How to Use Nikon Strobes Wirelessly, for Free!; Dec. 17, 2005; http://web.archive.org/web/20051217091704/http://www.kenrockwell.com/nikon/ittlslave.htm; last viewed at Internet archive on Apr. 1, 2010.
Nikon D2x; Sep. 2004; pp. 1 to 12; Nikon Corporation.
Nikon WT-1 Transmitter User's Manual; around Dec. 2003; Nikon Corporation.
Nikon WT-2 Article, Part 1; Nikon Corporation; http://nikonimaging.com/global/technology/scene/11/index.htm; last viewed on Mar. 14, 2008.
Nikon WT-2 Article, Part 2: Nikon Corporation; http://nikonimaging.com/global/technology/scene/11/index_02.htm; last viewed on Mar. 14, 2008.
Phil Askey, Nikon D2H Review: 15. Wireless: Digital Photography Review, Wireless (Review of WT-1 Transmitter); Dec. 2003; http://www.dpreview.com/reviews/NikonD2H/page15.asp; last viewed on Mar. 18, 2008.
Phil Askey, Nikon D2H Review: 1. Introduction: Digital Photography Review, Nikon D2H Review, Dec. 2003; http://www.dpreview.com/reviews/NikonD2H/; last viewed on Mar. 18, 2008.
Phil Askey, Nikon D2Hs Preview: 1. Introduction: Digital Photography Review (includes Review of WT-2 Transmitter); Feb. 2005; http://www.dpreview.com/articles/nikond2hs/; last viewed Mar. 14, 2008.
PocketWizard MultiMAX Transceiver New Trigger Control Software Features, by LPA Design, Feb. 10, 2001 pp. 1 to 6, United States.
PocketWizard MultiMAX Transceiver Owner's Manual, by LPA Design, May 2001, pp. 1-55 and "Relay Mode" on p. 40, United States.
Quantum FreeWire Transceiver; Jul. 17, 2005; pp. 1 to 7; http://web.archive.org/web/20050717015832/http://www.qtm.com/wireless/freewire.html; last viewed at Internet Archive on Apr. 25, 2008.
Quantum FreeWire Transceiver; Nov. 15, 2004; pp. 1 to 7; http://web.archive.org/web/20041115093657/http://www.qtm.com/wireless/freewire.html; last viewed at Internet Archive on Apr. 25, 2008.
Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.
Rob Galbraith; Casting Light on the PocketWizard MiniTT1 and FlexTT5; Parts 1 to 5; Feb. 16, 2009; http://www.robgalbraith.com/bins/multi_page.asp?cid=7-9884-9903; last viewed on Jul. 12, 2012.
Robert Hanashiro; Equipment Corner—News & Notes for all Those Gear-Heads; Nov. 26, 2001; pp. 1-3; http://www.sportsshooter.com/news_story.html?id=594; last viewed on Sep. 17, 2002.
Strobist Blog: PocketWizard FlexTT5 and MiniTT1: Full Review; Feb. 16-18, 2009; blog comments, pp. 1-40; http://strobist.blogspot.com/2009/02/pocketwizard-flextt5-and-minitt1-full.html; last viewed on Feb. 18, 2009.
Strobist Blog: PocketWizard FlexTT5 and MiniTT1; Full Review; Feb. 16, 2009; pp. 1-11; http://strobist.blogspot.com/2009/02/pocketwizard-flextt5-and-minitt1-full.html; lavst viewed on Feb. 18, 2009.
XE-200 RF Shutter Release for Rebel 2000; http://zenopuseelectronix.com/XE-200.html; last viewed on Sep. 9, 2002.
U.S. Appl. No. 11/305,668, Mar. 8, 2006, Office Action, 7,133,607.
U.S. Appl. No. 11/305,668, Jun. 8, 2006, Response to Office Action, 7,133,607.
U.S. Appl. No. 11/305,668, Jun. 13, 2006, Supplemental Response to Request for Clarification by the Examiner, 7,133,607.
U.S. Appl. No. 11/305,668, Jun. 30, 2006, Notice of Allowance, 7,133,607.
U.S. Appl. No. 11/305,668, Mar. 29, 2007, Request for Correction of Letters, 7,133,607.
U.S. Appl. No. 11/529,203, Aug. 14, 2007, Office Action, 7,362,965.

(56) References Cited

OTHER PUBLICATIONS

U.S. Appl. No. 11/529,203, Oct. 16, 2007, Terminal Disclaimer, 7,362,965.
U.S. Appl. No. 11/529,203, Oct. 16, 2007, Response to Office Action, 7,362,965.
U.S. Appl. No. 11/529,203, Oct. 25, 2007, Terminal Disclaimer, 7,362,965.
U.S. Appl. No. 11/529,203, Dec. 14, 2007, Notice of Allowance, 7,362,965.
U.S. Appl. No. 12/104,950, Dec. 31, 2009, Office Action, 7,764,875.
U.S. Appl. No. 12/104,950, Feb. 1, 2010, Response to Office Action, 7,764,875.
U.S. Appl. No. 12/104,950, Mar. 23, 2010, Notice of Allowance, 7,764,875.
U.S. Appl. No. 12/843,254, Jul. 27, 2010, Preliminary Remarks, 8,121,468.
U.S. Appl. No. 12/843,254, Aug. 25, 2011, Office Action, 8,121,468.
U.S. Appl. No. 12/843,254, Aug. 25, 2011, Response to Office Action, 8,121,468.
U.S. Appl. No. 12/843,254, Aug. 25, 2011, Terminal Disclaimer, 8,121,468.
U.S. Appl. No. 12/843,254, Nov. 28, 2011, Notice of Allowance, 8,121,468.
U.S. Appl. No. 13/399,333, Jun. 14, 2012, Office Action, 8,351,744.
U.S. Appl. No. 13/399,333, Sep. 14, 2012, Response to Office Action, 8,351,744.
U.S. Appl. No. 13/399,333, Sep. 14, 2012, Terminal Disclaimers, 8,351,744.
U.S. Appl. No. 13/399,333, Sep. 28, 2012, Notice of Allowance, 8,351,744.
U.S. Appl. No. 10/306,759, Aug. 29, 2003, Office Action, 7,016,603.
U.S. Appl. No. 10/306,759, Dec. 18, 2003, Response to Office Action, 7,016,603.
U.S. Appl. No. 10/306,759, Dec. 24, 2003, Examiner Interview Summary, 7,016,603.
U.S. Appl. No. 10/306,759, Mar. 27, 2004, Final Office Action, 7,016,603.
U.S. Appl. No. 10/306,759, Apr. 15, 2005, Examiner Interview Summary, 7,016,603.
U.S. Appl. No. 10/306,759, Apr. 20, 2004, Response to Final Office Action, 7,016,603.
U.S. Appl. No. 10/306,759, Aug. 24, 2004, Office Action, 7,016,603.
U.S. Appl. No. 10/306,759, Feb. 18, 2005, Request for Continued Examination, 7,016,603.
U.S. Appl. No. 10/306,759, Mar. 29, 2005, Office Action, 7,016,603.
U.S. Appl. No. 10/306,759, Apr. 14, 2005, Response to Office Action, 7,016,603.
U.S. Appl. No. 10/306,759, Jun. 29, 2005, Final Office Action, 7,016,603.
U.S. Appl. No. 10/306,759, Aug. 25, 2005, Response to Final Office Action, 7,016,603.
U.S. Appl. No. 10/306,759, Sep. 16, 2005, Notice of Allowance, 7,016,603.
U.S. Appl. No. 10/306,759, Oct. 18, 2005, 312 Amendment, 7,016,603.
U.S. Appl. No. 10/306,759, Dec. 20, 2005, Response to 312 Amendment, 7,016,603.
U.S. Appl. No. 10/306,759, Jan. 4, 2006, Response to 312 Amendment, 7,016,603.
U.S. Appl. No. 10/306,759, Nov. 18, 2006, Certificate of Correction, 7,016,603.
U.S. Appl. No. 11/488,491, Oct. 16, 2007, Office Action.
U.S. Appl. No. 11/490,322, Apr. 20, 2010, Office Action, 7,880,761.
U.S. Appl. No. 11/490,322, Jul. 12, 2010, Response to Office Action, 7,880,761.
U.S. Appl. No. 11/490,322, Sep. 15, 2010, Notice of Allowance, 7,880,761.
U.S. Appl. No. 12/250,914, Jun. 12, 2009, Office Action, 7,702,228.
U.S. Appl. No. 12/250,914, Jun. 29, 2009, Response to Office Action and Terminal Disclaimer, 7,702,228.
U.S. Appl. No. 12/250,914, Oct. 28, 2009, Terminal Disclaimer, 7,702,228.
U.S. Appl. No. 12/250,914, Dec. 3, 2009, Notice of Allowance, 7,702,228.
U.S. Appl. No. 12/762,811, Dec. 28, 2010, Office Action, 7,970,267.
U.S. Appl. No. 12/762,811, Mar. 28, 2011, Response to Office Action, 7,970,267.
U.S. Appl. No. 12/762,811, Mar. 28, 2011, Terminal Disclaimer, 7,970,267.
U.S. Appl. No. 12/762,811, Apr. 20, 2011, Notice of Allowance, 7,970,267.
U.S. Appl. No. 13/169,413, Dec. 20, 2011, Office Action, 8,180,210.
U.S. Appl. No. 13/169,413, Jan. 16, 2012, Response to Office Action, 8,180,210.
U.S. Appl. No. 13/169,413, Jan. 16, 2012, Terminal Disclaimers, 8,180,210.
U.S. Appl. No. 13/169,413, Mar. 22, 2012, Notice of Allowance, 8,180,210.
U.S. Appl. No. 13/438,500, Jun. 18, 2012, Office Action.
U.S. Appl. No. 13/438,500, Sep. 14, 2012, Response to Office Action.
U.S. Appl. No. 13/438,500, Sep. 14, 2012, Terminal Disclaimers.
U.S. Appl. No. 11/697,241, Nov. 8, 2007, Office Action, 7,437,063.
U.S. Appl. No. 11/697,241, Mar. 10, 2008, Response to Office Action, 7,437,063.
U.S. Appl. No. 11/697,241, Mar. 24, 2008, Examiner Interview Summary, 7,437,063.
U.S. Appl. No. 11/697,241, Jun. 9, 2008, Notice of Allowance, 7,437,063.
U.S. Appl. No. 12/129,447, Apr. 12, 2010, Notice of Allowance, 7,775,575.
U.S. Appl. No. 12/129,447, Apr. 12, 2010, Examiner Amendment, 7,775,575.
U.S. Appl. No. 12/861,445, Sep. 30, 2010, Notice of Allowance, 7,885,533.
U.S. Appl. No. 13/021,951, Nov. 25, 2011, Notice of Allowance, 8,331,776.
U.S. Appl. No. 13/021,951, Feb. 13, 2012, Withdrawal of Notice of Allowance, 8,331,776.
U.S. Appl. No. 13/021,951, Feb. 22, 2012, Office Action, 8,331,776.
U.S. Appl. No. 13/253,596, Nov. 30, 2011, Office Action, 8,326,140.
U.S. Appl. No. 13/253,596, Feb. 29, 2012, Response to Office Action, 8,326,140.
U.S. Appl. No. 13/253,596, May 9, 2012, Final Office Action, 8,326,140.
U.S. Appl. No. 12/129,402, Apr. 19, 2010, Notice of Allowance, 7,783,188.
U.S. Appl. No. 13/208,686, Feb. 6, 2013, Office Action.
U.S. Appl. No. 13/208,706, Dec. 26, 2012, Office Action.
U.S. Appl. No. 13/183,046, Feb. 13, 2013, Office Action.
U.S. Appl. No. 11/305,668, filed Dec. 16, 2005, 7,133,607.
U.S. Appl. No. 11/529,203, filed Sep. 27, 2006, 7,362,965.
U.S. Appl. No. 12/104,950, filed Apr. 17, 2008, 7,764,875.
U.S. Appl. No. 12/843,254, filed Jul. 26, 2010, 8,121,468.
U.S. Appl. No. 13/399,333, filed Feb. 17, 2012, 8,351,774.
U.S. Appl. No. 13/735,325, filed Jan. 7, 2013.
U.S. Appl. No. 10/306,759, filed Nov. 26, 2002, 7,016,603.
U.S. Appl. No. 13/016,345, filed Jan. 28, 2011.
U.S. Appl. No. 11/490,322, filed Jul. 20, 2006, 7,880,761.
U.S. Appl. No. 12/250,914, filed Oct. 14, 2008, 7,702,228.
U.S. Appl. No. 12/762,811, filed Apr. 19, 2010, 7,970,267.
U.S. Appl. No. 13/169,413, filed Jun. 27, 2011, 8,180,210.
U.S. Appl. No. 13/438,500, filed Apr. 3, 2012.
U.S. Appl. No. 11/697,241, filed Apr. 5, 2007, 7,437,063.
U.S. Appl. No. 12/129,447, filed May 29, 2008, 7,775,575.
U.S. Appl. No. 12/861,445, filed Aug. 23, 2010, 7,885,533.
U.S. Appl. No. 13/021,951, filed Feb. 7, 2011, 8,331,776.
U.S. Appl. No. 13/253,596, filed Oct. 5, 2011, 8,326,140.
U.S. Appl. No. 13/708,326, filed Dec. 7, 2012.
U.S. Appl. No. 12/129,402, filed May 29, 2008, 7,783,188.
U.S. Appl. No. 13/201,182, filed Aug. 11, 2011.
U.S. Appl. No. 13/201,185, filed Aug. 11, 2011.
U.S. Appl. No. 13/208,686, filed Aug. 12, 2011.
U.S. Appl. No. 13/208,706, filed Aug. 12, 2011.
U.S. Appl. No. 13/201,281, filed Aug. 12, 2011.
U.S. Appl. No. 13/401,175, filed Feb. 21, 2012.
U.S. Appl. No. 13/183,046, filed Jul. 14, 2011.

* cited by examiner

SYSTEMS AND METHODS FOR CHANGING POWER STATES OF A REMOTE DEVICE USING ONE OR MORE CAMERA BODY CONTROLS AND A PRESET DELAY

RELATED APPLICATION DATA

This application is a continuation of U.S. application Ser. No. 12/705,052, filed Feb. 12, 2010, and titled "Systems and Methods For Changing Power States Of A Remote Device Using One or More Camera Body Controls and A Preset Delay," which application claims the benefit of priority of U.S. Provisional Patent Application No. 61/151,876, filed on Feb. 12, 2009, and titled "Systems And Methods For Changing Power States Of A Remote Device Using One Or More Camera Body Controls And A Preset Delay." Each of these applications is incorporated by reference herein in its entirety.

FIELD OF THE INVENTION

The present invention generally relates to the field of photography. In particular, the present invention is directed to systems and methods for changing power states of a remote device using one or more camera body controls and a preset delay.

BACKGROUND

Photography is an integral component of modern society, and photographed images pervade our lives. Photographic images appear, for example, in books, magazines, catalogs, journals, newspapers, billboards, posters and scrapbooks and are displayed in homes, art galleries, retail stores, shopping malls, office buildings and many other places. While many photographic images are acquired using only natural ambient light, many other images are acquired using photographic flash lighting. When image-acquisition flash lighting is used, a photographer often uses one or more modeling lights prior to image acquisition for any of a variety of reasons, such as checking for unwanted shadows, glare, reflection, etc. and/or checking for desired shadows and other lighting effects. Generally, these modeling lights are either kept powered up to a sufficient level or turned up to a sufficient level when needed. Keeping the modeling lighting powered up can be problematic due to the heat this type of lighting generates, which can be uncomfortable for live models and detrimental to heat-sensitive still subjects. Occasionally turning up the power of modeling lighting can be inconvenient, even using more recent remotely-controlled modeling lights.

Many photographic images are acquired without adding special effects to the captured scene. However, many other photographic images are acquired using added special effects, such as artificial wind, snow, mist and rain, and/or using contrived scenes that use in-scene props and other items, such as in-scene lighting. Today, many special effects generators, for example, fans, snow shakers, misters and rain systems, are turned off and on electronically using dedicated on/off and/or speed/power control switches. Similarly, in-scene lighting can often be controlled using such dedicated control switches. Typically, a photographer, or more often a photographer's assistant, has the task of controlling the operation of any special effects devices and in-scene lighting for image acquisition.

In addition, some photographic settings, such as very low-light scenes photographed in a photography studio (or other location having controllable ambient lighting), require ambient lighting to be lowered or turned off during image acquisition so that the ambient light does not interfere with image acquisition. Often, this ambient lighting needs to remain on except for short periods at and around the time of image acquisition because the ambient lighting is necessary for the photographer and any assistants to see while moving around the studio and/or readying the scene for image acquisition. Usually, a photographer or photographer's assistant manually controls the pertinent ambient lighting device(s) using conventional dedicated controls.

SUMMARY OF THE DISCLOSURE

In one implementation, the present disclosure is directed to a method of changing power states of a remote lighting device using a camera body, including detecting at least one first camera body signal that is generated as a function of a user actuation of at least one camera body control; generating a first power level signal in response to said detecting of the at least one first camera body signal, the first power level signal including data representing a first power output level for the remote lighting device; wirelessly transmitting the first power level signal so as to cause the remote lighting device to operate at the first power output level; implementing a preset delay; and causing the remote lighting device to change from the first power output level to a second power output level different from the first power output level in response to expiration of the preset delay.

In another implementation, the present disclosure is directed to a system for changing power states of a remote lighting device using a camera body. The system includes a means for detecting at least one first camera body signal that is generated as a function of a user actuation of at least one camera body control; a means for generating a first power level signal in response to said detecting of the at least one first camera body signal, the first power level signal including data representing a first power output level for the remote lighting device; a means for wirelessly transmitting the first power level signal so as to cause the remote lighting device to operate at the first power output level; a means for implementing a preset delay; and a means for causing the remote lighting device to change from the first power output level to a second power output level different from the first power output level in response to expiration of the preset delay.

In still another implementation, the present disclosure is directed to a machine-readable hardware storage medium containing machine-executable instructions for performing a method of changing power states of a remote lighting device using a camera body. The machine-executable instructions includes a set of machine-executable instructions for implementing detection of at least one first camera body signal that is generated as a function of a user actuation of at least one camera body control; a set of machine-executable instructions for generating a first power level signal in response to the detection of the at least one first camera body signal; a set of machine-executable instructions for initiating transmitting of the first power level signal so as to cause the remote lighting device to operate at a first power state; a set of machine-executable instructions for implementing a preset delay; and a set of machine-executable instructions for causing the remote lighting device to change from the first power state to a second power state different from the first power state in response to expiration of the preset delay.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

DETAILED DESCRIPTION

Figure 1:
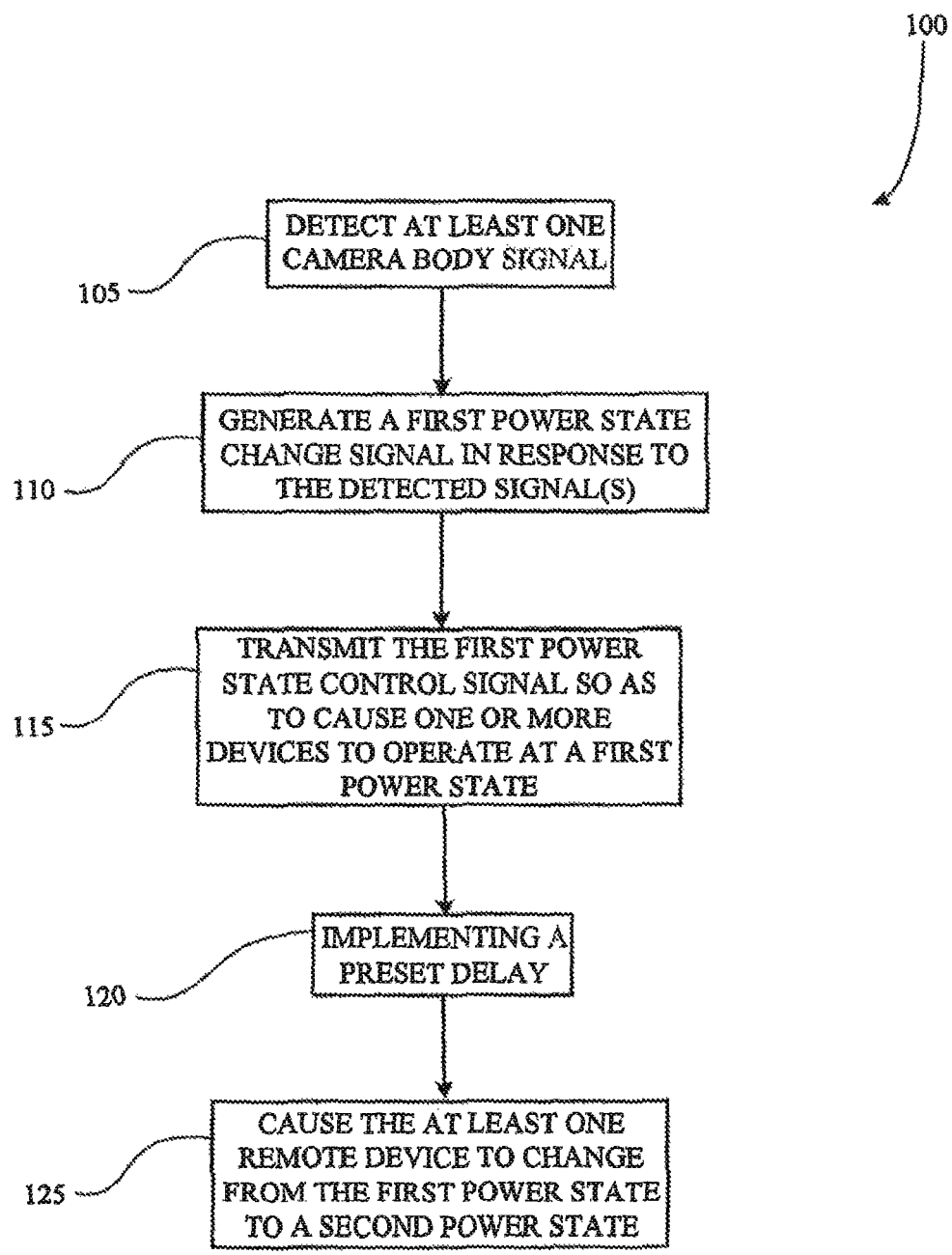
FIG. 1 is a flow diagram illustrating a method of changing power states of a remote device using one or more camera body controls and a preset delay.

Referring now to the drawings, FIG. 1 illustrates a method 100 of changing power states of a remote device using one or more camera body controls and a preset delay. As will be readily understood by those skilled in the art after reading this entire disclosure, a control method containing broad concepts disclosed herein, such as method 100, is useful for a number of purposes, including: allowing a photographer to use modeling lighting to check for unwanted and/or wanted lighting effects and levels that will appear in images captured using flash photography; allowing a photographer to control operation of remote special effects; allowing a photographer to control ambient and in-scene lighting; allowing a photographer to control remotely controllable devices appearing in a photographic scene; and any combination thereof, all without having to remove an eye from the camera's viewfinder or live-view display. Such a control method also allows for use of modeling lighting to provide light for assisting a camera in carrying out its autofocus functionality.

Method 100 typically begins at step 105 by detecting one or more camera body signals. As used herein and in the appended claims, the term "camera body signal" and like terms mean a signal generated either internally or externally relative to the camera body and that is used to control functionality inherent in the camera body itself, any lens attached thereto and any image-acquisition flash-lighting device attached to the camera body or responsive to a flash-sync signal generated by the camera body. Because the present disclosure is directed to controlling devices starting prior to any image capturing, a shutter-release signal is excluded from the term "camera body signal." As those skilled in the art will appreciate, the term "shutter" as used herein and in the appended claims is intended to refer to a mechanical shutter, an electronic shutter and any combination thereof and equivalent thereto.

A camera body signal can be generated by a user actuating any type of switch or other actuator, mechanical, soft or otherwise. A camera body signal can also be generated by circuitry internal to a camera body in response to any one or more of a variety of events, such as a user actuating a switch (e.g., a partial press (a/k/a "half press") of a shutter release button or a press of an autofocus button or a depth-of-field preview button) and camera body circuitry determining a particular function is needed (e.g., a camera processor determining that the lens needs to be autofocused), among others. Examples of a camera body signal generated internally within the camera body include, but are not limited to, a camera body wake signal, a camera body sleep signal, an autofocus assist signal, a camera body backlighting on/off signal, a menu control signal, a flash compensation signal, a signal from a "click wheel" or other user control, such as a partial-press switch signal generated upon a partial press of a shutter-release button. Examples of a camera body signal generated externally include, but are not limited to, a partial-press switch signal initiated from an external device and communicated to the camera body, for example, via an external communications port on the camera body (e.g., a hotshoe, a proprietary connector port, a motor-drive port, a universal serial bus (USB) port, a "FIREWIRE" (IEEE 1394) port, etc.) and any other camera body signal that can be initiated or generated externally from the camera body. Specific examples are described below in detail to give the reader an understanding of how step 105 can be implemented.

However, those skilled in the art will appreciate that controls provided to a particular camera body and camera body control signals vary to a great extent such that it is impractical to cover all current conventional camera body controls and camera body control signals, and that it is virtually impossible to predict future camera body controls and camera body control signals. That said, those skilled in the art will readily be able to implement the broad concepts of the present disclosure for virtually any one or more camera body controls and/or any one or more camera body signals. The detection of the one or more camera body signals can be performed internally or externally relative to the camera body, for example, by a controller, such as a microprocessor/software systems, hardware controller, a combination of these, or other circuitry. Several examples of internal and external detection are described below in detail.

At step 110 a first power state change signal is generated in response to the detection of the one or more camera body signals in step 105. Like detecting step 105, generating step 110 can be performed internally or externally relative to the camera body, depending on the configuration of the overall control system. For example, if a particular camera body includes an internal controller, generating step 110 can be performed internally. In another example in which a controller is provided externally to a camera body, generation step 110 is performed outside the camera body. As will become apparent from the detailed examples provided below, the first power state change signal can be, for example, a signal recognizable directly by the target, i.e., controlled, device(s) or recognizable by an intermediate device, such as a wireless receiving device that, in turn, generates one or more signals recognizable by the controlled device(s). The relevant signaling depends on the overall configuration of the system. As will also be discussed below, the first power state change signal may be accompanied by and/or contain data, such as one or more power level values and/or a power state change time delay value for a subsequent power change, among others. Examples of such data are described below in the detailed examples.

At step 115 the first power state change signal is transmitted so as to cause one or more controlled devices to operate at a first power state. As alluded to above relative to generating step 110, the way the controlled device(s) are caused to operate at the first power state depends on the configuration of the overall control system. For example, if a particular controlled device has user-settable power level settings that can be input wirelessly, then the system can be configured, for example, so that the power state change signal contains a desired power level setting. In another example, if a particular controlled device has user-settable power level settings that can be input only either through an onboard user interface on the device or through a wired port on the device, then the system may include two wireless devices, a first one at the camera body and a second one connected to the wired input port of the controlled device. In one scenario, the first wireless device at the camera body may transmit a simple remote-device trigger signal to the second wireless device at the controlled device. In this case, upon receiving the trigger signal the second wireless device would, for example, send the illumination output level setting. If multiple controlled devices are being controlled at the same time via wireless devices, each of these devices may have a unique identifier that a properly configured system can utilize to implement differing control schemes among the multiple devices. Detailed examples of ways of implementing transmitting step 115 are presented below.

After each controlled device has been set to the first power state at step 110, at step 120 a preset delay is implemented. This preset delay determines how long each controlled device will be kept at the first power state before the device will be changed to a second power state. Typically, the preset delay will be on the order of 1 second to 5 seconds or more, depending on the needs of the photographer. Such preset delay can be set in any suitable manner. For example, in some embodiments the preset delay can be set by a photographer or assistant. In other embodiments, the preset delay can be set by the manufacturer of the device providing the preset delay.

The way that step 120 can be accomplished varies, for example, with the overall system configuration and capability of the controlled device(s). For example, if a particular controlled device has a built-in timer that is wirelessly settable with a delay and the device is able to change its power state when the timer times-out on the delay, then the transmission of the first power state change signal at step 115 can be accompanied not only by a desired power change setting for the first power state change but also by a delay value and a desired power state setting for the second power state change. Then, when the built-in timer times-out on the set delay, the controlled device automatically changes from the first power state to the second power state. In another example wherein a controller at the camera body has a timer and the controlled device at issue is responsive to power state change signals containing corresponding respective power change settings, at step 115 the controller sends the first power state change signal containing a power state setting for the first power state and then sets its internal timer to the desired delay. Then, when the controller's timer times-out on the set delay, at step 125 the controller sends a second power state change signal containing a power change setting for the second power state change.

A further example includes two wireless devices and a controlled device that has settable power states and a settable delay, but only through a wired port. In one scenario, at step 115 a first one of the wireless devices at the camera body sends the first power state change signal to a second one of the wireless devices at the controlled device. When the second wireless device at the controlled device receives the first power state change signal, it then loads first and second power state settings and delay value into the controlled device, and the controlled device uses this information to control the first and second power changes. In this example, steps 120, 125 are performed by the various aspects of the sending of the original power state signal, loading of the delay and second power state setting by the second wireless device and the response of the controlled device to the set delay and second power state level. In a dual wireless device scenario other variations include, but are not limited to, the first device including the delay timer, the second device including the delay timer, the first device being programmed with desired power state levels and delay value and the second device being programmed with desired power state levels and delay value. Those skilled in the art will readily appreciate that there are numerous possible scenarios for performing steps 120, 125 and that a description of all of these scenarios is not needed for those skilled in the art to implement the broad concepts disclosed herein in any of the possible scenarios based on the present disclosure. Several particular examples of possible scenarios are described below in detail.

Figure 2:
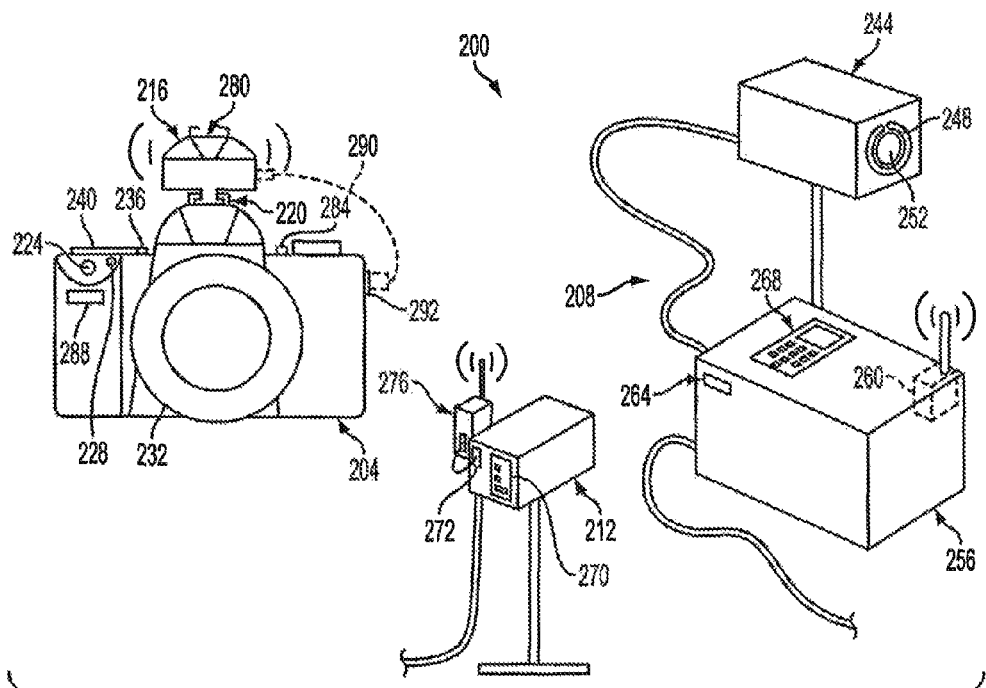
FIG. 2 is a diagram of a photographic system that includes a camera, a wireless controller, a remote multifunctional lighting system incorporating a modeling lighting source, and a special effects fan, wherein the system is configured to perform steps of the method of FIG. 1.

FIG. 2 illustrates an exemplary photographic system 200 that is configured to carry out the steps of method 100 of FIG. 1. Referring to FIG. 2, and also to FIG. 1, photographic system 200 includes a camera body 204 and two continuous type modeling lighting apparatuses, namely, a multifunction lighting system 208, which includes a continuous modeling light, and a dedicated modeling lighting device 212. In this example, each modeling lighting apparatus 208, 212 is controllable from camera body 204 via a controller 216 mounted to a hotshoe 220 on the camera body. As described below in detail, controller 216 is configured to control the modeling lighting functionality of multifunction lighting system 208 in one, the other, or both of a wake mode and an autofocus assist mode, depending on a user's preference, and to control modeling lighting device 212 in a backlight control mode. Briefly, wake mode of controller 216 uses a camera body wake signal and a corresponding camera body sleep signal each generated by camera body 204 to control scene illumination output levels of continuous type modeling lighting of multifunction lighting system 208. The wake signal may be generated by any of a variety of controls on camera body 204. However, a very useful control for a photographer to use to initiate the wake signal is a shutter release button 224 on camera body 204, a partial press (commonly referred to as a "half press") of which causes the camera body to generate a wake signal. The corresponding sleep signal is typically automatically generated by camera body 204, for example, by an internal microprocessor, after a preset time following release of the shutter release or other control.

Autofocus assist (AFA) mode of controller 216 uses a camera body autofocus assist signal generated by camera body 204 to control scene illumination output levels of the modeling lighting of multifunction lighting system 208. In this example, camera body 204 is configured to generate an autofocus assist signal in two ways, a first in response to a user pressing an autofocus ("AF") button 228 located on the camera body within ready reach of a photographer's thumb and a second in response to the camera body (via autofocus circuitry (not shown)) determining that a lens 232 attached to the camera body needs to be actuated to bring the scene into focus. The generation of camera body autofocus assist signals in both of these manners is well known in the art such that further description is not necessary herein for those skilled in the art to implement the broad concepts disclosed herein.

In this example, backlight (B/L) mode of controller 216 uses a camera body 204 backlighting control signal generated by camera body to control scene illumination output levels of modeling lighting device 212. In this case, camera body 204 includes a backlighting control button 236 that a user uses to turn backlighting of one or more displays, such as LCD display panel 240, on the camera body on and off as desired. It is noted that differing camera body models have differing ways of handling backlighting functionality and signaling. For example, some current camera body models have on-actuators, like backlight control button 236, whereas others have on-switches. In most current camera bodies, each type of actuator is used in conjunction with a built-in timer used to control when the camera body turns the backlighting off. In addition, some current camera body models make the camera body backlighting signaling available at the hotshoe of the camera body, whereas others do not. As will be seen below, camera body 204 of FIG. 2 is of the type that makes camera body backlight signaling available at hotshoe 220. Camera body 204 is also configured like many conventional camera bodies to make camera body wake (and sleep) and autofocus assist signals available at hotshoe 220. Further details of wake, AFA and B/L modes of controller are described below in greater detail after a description of multifunction lighting system 208 and modeling lighting device 212.

In this example, multifunction lighting system 208 includes a dual function lighting head 244 that provides both image acquisition strobe light from a flash source 248 (such as a xenon flash tube) and continuous light from a continuous light source 252 (such as a tungsten bulb). Lighting head 244 is powered by a suitable generator pack 256. A similar multifunctional lighting system is available from Profoto, Stockholm, Sweden, among other photographic lighting manufacturers. Generator pack 256 includes a built-in wireless communications device 260 and an onboard microprocessor (not shown) responsive to a relatively robust set of user-settable lighting control parameters, including modeling lighting control parameters. Parameters for operating multifunction lighting system 208 that a user is able to set/control using wireless communications device 260 include illumination output level settings. In this example, wireless communications device 260 implements a pair of illumination level change delay settings. The use of these parameters and settings is described below in greater detail.

Wireless communications device 260 is in wireless RF communication with controller 216 so as to receive one or more instructions (sets) for controlling the operation of multifunction lighting system 208. In this connection, wireless communications device 260 includes an RF receiver (not shown). In other embodiments, wireless communications device 260 may also include an RF transmitter or, alternatively to separate RF receiver and transmitter, an RF transceiver. It is noted that in yet other embodiments, wireless communications may be implemented using another communication technique, such as visible-light communication (e.g., using a strobe attached to controller 216) and infrared communication, among others.

When an instruction (of instruction set, depending on the communication protocol) containing a power level setting is received by the built-in microprocessor of generator pack 256 (for example via built-in wireless communications device 260, an external port 264 or a built-in user interface 268), the onboard microprocessor changes the output illumination level of continuous light source 252 to the setting provided in that instruction (set). If a delay value is not also provided with the instruction (set), continuous light source 252 will stay at the new setting until the microprocessor receives another power state instruction, such as another illumination output setting or a power-off instruction. However, when the onboard microprocessor of generator pack 256 receives an instruction (set) containing first and second power level settings and a delay setting, the built-in microprocessor first changes the illumination output of continuous light source 252 to the first power level setting, holds the illumination output for the delay setting and then changes the illumination output to the second power level setting. The power level setting may be expressed in any convenient form, such as percentage of maximum output power, absolute input power or absolute output power, among others. The delay setting may also be expressed as any convenient value, such as number of seconds, minutes or other predefined periods.

In this example, modeling lighting device 212 is a standalone modeling lighting device that utilizes a continuous light source (on hidden side of device 212, but such as a tungsten bulb, a light-emitting diode (LED) or an array (panel) of LEDs) to provide continuous light at a user-selectable illumination output level. Such a modeling lighting device is available from Elinca, Geneva, Switzerland, among other photographic lighting manufacturers. Modeling lighting device 212 includes an onboard controller (not shown) that can be set to any one of various illumination output levels via either of an integrated user interface 270 and a wired communications port 272. Because modeling lighting device 212 does not have a built-in wireless communications device like generator pack 256, the modeling lighting device is supplemented with an external RF wireless communications device 276 that is in wired communication with wired communications port 272 of the device. In this example, modeling lighting device 212 is configured to be toggled between two user-preset illumination output levels set by a user via integrated user interface 270 in response to it receiving a certain trigger signal. Consequently, wireless communications device 276 is in wireless RF communication with controller 216 so as to receive first and second IOC signals (which may be the same as one another) that cause wireless communications device 276 to provide each certain toggling trigger signal to modeling lighting device 212. In this connection, wireless communications device 276 includes an RF receiver (not shown). In other embodiments, wireless communications device 260 may also include an RF transmitter or, alternatively to separate RF receiver and transmitter, an RF transceiver. It is noted that in yet other embodiments, wireless communications may be implemented using another communication technique, such as visible-light communication (e.g., using a strobe attached to controller 216) and infrared communication, among others.

In this example, wireless RF communications among controller 216, wireless RF communications device 260 of generator pack 256 and wireless RF communications device 276 of modeling lighting device 212 includes the ability of each of these devices to distinguish signaling meant for it from signaling meant for any other device. This can be accomplished in any of a variety of ways, such as by each device having a unique address and including in each transmission the unique address(es) of the device(s) intended to receive a particular transmission. Further detail of such signaling techniques is beyond the scope of this disclosure and is not needed for those skilled in the art to implement such techniques, since they are known in the art.

As those skilled in the art will readily appreciate, hotshoe 220 has a number of electrical contacts (not shown) for communicating various signals to and/or from an accessory, typically a flash device or strobe-controlling radio, mounted to the hotshoe. In this example, camera body 204 is of a type that outputs a camera body wake/sleep signal(s) via one of the pins, denoted the first pin, and outputs a camera body autofocus assist signal via the same first pin. Also in this example, the camera body wakeup signal is characterized by a first voltage change, here from a low level to an intermediate level, the camera body sleep signal is characterized by a second voltage change, here from the intermediate level to the low level, and camera body autofocus assist signal is identified by a third voltage change, here from the intermediate level to a high level. This example is discussed further below in connection with FIGS. 6 and 7. Further, in this example the camera body backlight control signal appears on a second pin different from the first pin and is identified by an increase in voltage from a low voltage to a higher voltage that is held high while the backlighting is to be on. It is noted that some current camera bodies, such as EOS-series SLRs/DSLRs available from Canon, Inc., Tokyo, Japan, do not provide backlight signals externally through a hotshoe, whereas other current camera bodies, such as SLRs/DLSRs available from Nikon Corporation, Tokyo, Japan, provide backlight on/off information via a status bit in a digital communications bit cluster, for example to allow the camera-body backlighting control signal to control backlighting on a flash unit mounted to the hotshoe. Other camera bodies can have different backlighting signaling arrangements, such as the one illustrated in FIGS. 6 and 7.

Another characteristic of this example is that backlight control mode is of a non-delay-type. That is, the camera body backlighting stays on until a user turns it off, here, using backlighting control button 236. Consequently, when a user activates camera body backlight control button 236 to turn camera body backlighting on, controller 216 is configured to cause a first illumination output change in modeling lighting device 212, here from off to on. (In this example, the photographer wants modeling lighting device 212 to be on when the backlighting of camera body 204 is on. However, there may be other situations when the photographer might want modeling lighting device 212 to be off when backlighting of camera body 204 is on. These differing options are described in more detail below.) Then, when the user activates backlight control button 236 again to toggle the camera body backlighting off, controller 216 is configured to cause a second illumination output change in modeling lighting device 212, here from on to off. Further details of this control scheme are provided below.

In the current embodiment, controller 216 is not (though it could be) part of a hotshoe-mountable flash device that is fully compatible with camera body 204 (i.e., is able to use any signaling camera body 204 makes available via hotshoe 220), although such a flash device (not shown), or other flash or non-flash device, may indeed be mounted on the controller via an auxiliary hotshoe 280 that has the same signals available as the signals available at hotshoe 220. Nonetheless, in this example, controller 216 is configured to utilize some of the same information that camera body 204 normally provides to a compatible flash device via hotshoe 220. Often, however, conventional camera bodies do not provide their hotshoes with any signaling, i.e., wake, sleep, autofocus assist, backlighting, etc., if they do not recognize that a compatible device has been engaged with the hotshoe. Consequently, in such cases, wireless controller 216 can be configured with an appropriate system for causing camera body 204 to provide the needed signals. U.S. patent application Ser. No. 12/129,402 filed on May 29, 2008, and titled "System and Method For Maintaining Hot Shoe Communications Between A Camera and A Wireless Device," discloses such systems and is incorporated herein by reference for all of its teachings on these systems.

Figure 3:
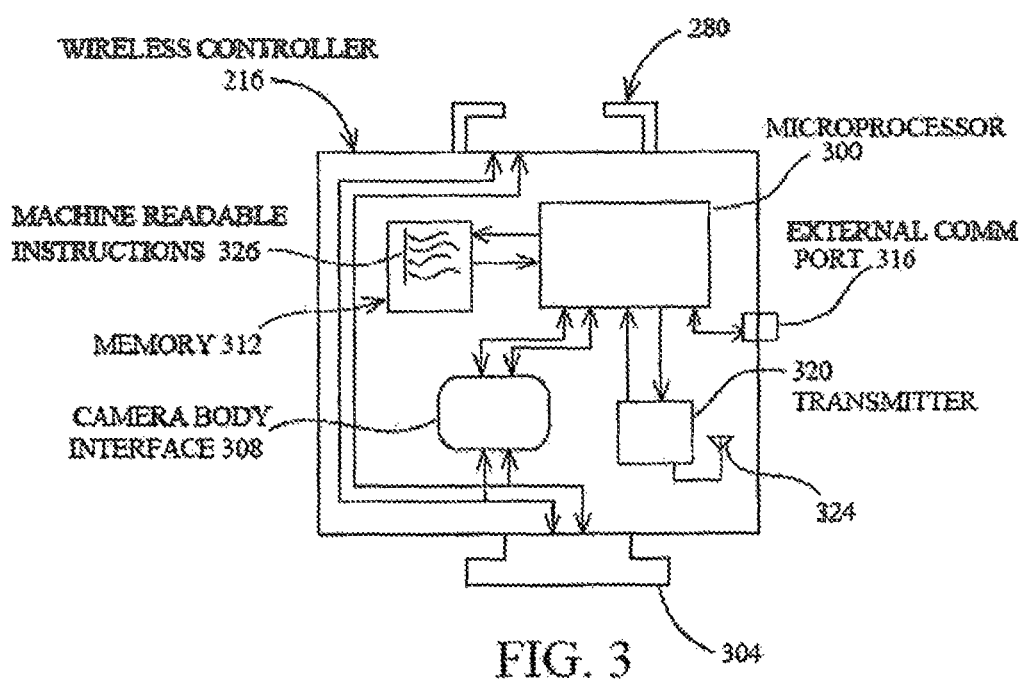
FIG. 3 is a high-level diagram of the wireless controller of FIG. 2.

Referring now to FIG. 3, and also to FIG. 2, in this example controller 216 includes, among other things, a microprocessor 300, a hotshoe connector 304, a camera body signal interface 308, memory 312, an external communications port 316, an RF transmitter 320 and an antenna 324. It is emphasized at this point, and will be recognized by those skilled in the art that the components of this example and their arrangement are presented for the sake of illustration and not limitation. Skilled artisans will understand that given the wide range of technologies available for implementing the overarching functionality disclosed herein, there are many ways of implementing this functionality. For example, while the various parts of controller 216 are shown as components discrete from one another, any two or more of the parts can be integrated onto a single integrated circuit chip, for example, as a system on chip. Similarly, various ones of the differing parts can be integrated with one another. For example, any memory provided may be partially or completely integrated with, for example, the microprocessor.

Further variations include the fact that RF transmitter 320 and corresponding antenna 324 can be replaced by another type of transmitting system, such as an infrared or visible light transmitter. An analog of the latter is a hotshoe mounted strobe device capable of sending data wireless to a remote strobe device using specially timed pulsed emissions from a flash tube. In still further variations, the parts of controller 216 provided to enable its functionality externally relative to a camera body, such as camera body 204 of FIG. 2, can be eliminated and most of the remaining parts adapted for location inside a camera body, except perhaps for an antenna, strobe, or other wireless signal transmitting device. In the case of putting the functionality of a controller of the present disclosure, such as controller 216, into a camera body, this can be accomplished by retrofitting an existing camera body or by designing the functionality into a new camera body design prior to production. In the latter case, any microprocessor(s)/circuitry used for the modeling lighting control functionality disclosed herein could be the same microprocessor(s)/circuitry that controls conventional camera functionalities. In yet other variations, any microprocessor/software implementation envisioned herein could be replaced by a purely hardware implementation at the choice of the designer. It is also noted that depending on the nature of the particular controller, the transmitter could be supplemented with a receiver, or both could be replaced by a transceiver without departing from the spirit of the embodiments disclosed and intended to be covered by the appended claims.

Returning now to the illustrative example, microprocessor 300 performs a host of functions including, but not limited to, executing machine-executable instructions 326 (e.g., firmware stored in memory 312), communicating with camera body interface 308, controlling/communicating with communications port 316, controlling/communicating with transmitter 320 and providing wireless controller 216 with its unique functionality. Camera body interface 308 receives signals from a camera body, such as camera body 204 of FIG. 2, for example via hotshoe 220, and transforms those signals as needed for use by microprocessor 300. Signals that camera body interface 308 is configured to transform in this example are a camera body wake/sleep signal, a camera body autofocus assist signal and a camera body backlight signal. An example of circuitry suitable for use in camera body interface 308 when these signals are analog voltage signals is described below in connection with FIG. 8. It is noted, however, that not all camera systems use analog signals to communicate information such as wake, sleep, autofocus assist, and backlight on/off externally from the camera body. Other camera systems handle such communication digitally, for example, using digitally encoded signals. In such cases, the camera body interface may simply be a data link to the microprocessor. Yet other camera systems may implement a hybrid approach wherein one or more signals are analog and one or more signals are digitally encoded. In the context of a microprocessor-based controller, the camera body interface would be configured to handle both types of signaling.

As alluded to above, memory 312 is used generically in FIG. 3 to denote any and all types of memory in communication with controller 216, including BIOS memory and RAM, among others, that are, as mentioned above, integrated into microprocessor 300 and/or provided externally to the microprocessor. Memory 312 contains information wireless controller 216 needs to perform its functionality, such as, but not limited to: machine-executable instructions 326 for enabling the functionality of the controller; controller setup data; controlled modeling light device parameter settings (such as illumination output levels and delay values); controlled device instructions (sets); and communications settings, e.g., transmit (and receive) frequencies, device identification codes, etc., among other things. Those skilled in the art will understand all of the various types of information that can/needs to be stored in memory 312 to make controller 216 a device that functions according to the concepts disclosed herein.

Figure 4:
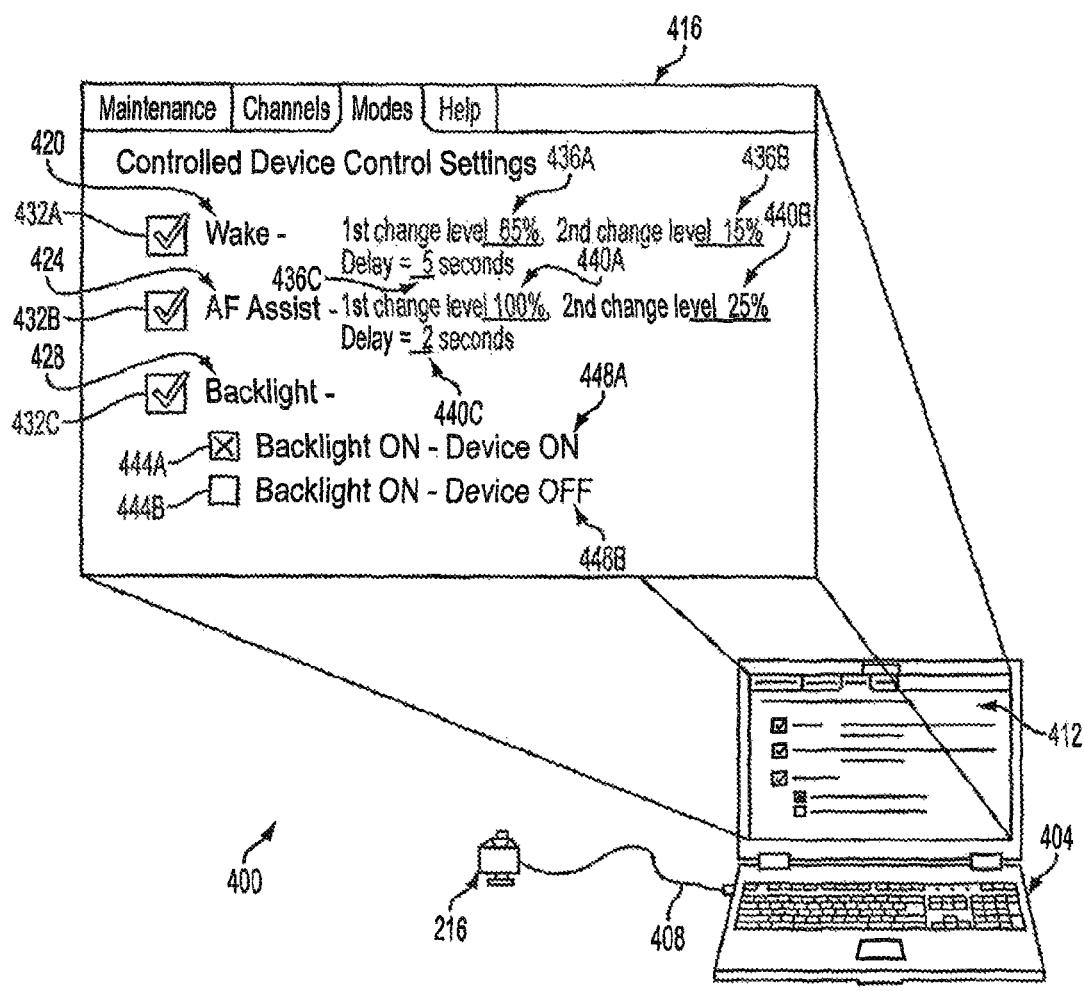
FIG. 4 is a diagram illustrating a computer-based environment for configuring a wireless controller, such as the external wireless controller of FIGS. 2 and 3.

Continuing with this illustrative example, external communications port 316 is provided for transferring information to and from controller 216. This allows a user to custom configure controller 216 and provide any needed operational settings for a particular application of the controller. In the present example, communications port 316 is a USB port. However, any other type of communications port, including a wireless port (e.g., Bluetooth, IEEE 802.11, etc.), can be provided in place of or in addition to USB port 316. In this connection, FIG. 4 illustrates controller 216 in an information transfer environment 400. In this example, controller 216 is connected to a suitable programming device, such as laptop computer 404 shown, via a USB cable 408 (since in this example external communications port 316 is a USB port). Laptop computer 404 provides a convenient vehicle for presenting to a user a graphical user interface (GUI) 412 of a software application (not shown, but running on the laptop computer in a conventional manner) designed for interacting with controller 216. GUI 412 is shown presenting a screen 416 that allows a user to select which mode(s) of device control operation the user desires to enable and also allows a user to set the appropriate parameter(s) for each of the selected modes.

It is noted that the example shown in FIG. 4 is simply that, exemplary. In other implementations the programming of a controller made according to the present disclosure can be accomplished in any one or more of a number of ways. For example, the controller can be provided with a user-interface, such as an LCD screen and one or more buttons or other input devices, a touchscreen, etc. that allow a user to program the controller. In other implementations, control parameter values for the controller can be set with one or more mechanical buttons, switches and/or dials, etc. In yet other implementations, control parameter values can be set wirelessly, for example, using a wireless port as mentioned above. In such a case, the programming device could be a smartphone (e.g., BlackBerry device, iPhone device), PDA, laptop computer, desktop computer, dedicated programming device, etc. Those skilled in the art will understand and appreciate the variety of ways that a controller of the present disclose can be programmed with desired control parameter values, if the controller is not preset with the desired values or is not programmable.

As mentioned above, in the present example, controller 216 is configured to have control functionality based on camera body wake signals ("Wake" mode 420), camera body autofocus assist signals ("AF Assist" mode 424) and camera body backlight controls signals ("Backlight" mode 428). Correspondingly, GUI 412 provides three primary selection controls (here a common GUI-type checkboxes 432A-C) corresponding respectively to the three modes 420, 424, 428. As will be seen below, a user can select any one, any two or all three of these modes 420, 424, 428, as desired.

If a user selects checkbox 432A indicating Wake mode 420, the wake mode parameter selection input fields 436A-C become active. In this example, Wake mode selection fields 436A-C are for inputting three desired values, respectively: 1) a first illumination output level, in this example the illumination output level to which to change the modeling lighting of multifunctional lighting system 208 (FIG. 2) as a function of controller 216 detecting a camera body wake signal; 2) a second illumination output level, here the illumination output level to which to change the modeling lighting of the multifunctional lighting system from the first illumination output level; and 3) a delay value used to determine when to cause the second illumination output level change. In this example, illumination output levels are expressed as a percentage of the maximum illumination output and the delay value is expressed in seconds.

If a user selects checkbox 432B indicating AF Assist mode 424, the autofocus assist parameter selection input fields 440A-C become active. In this example, autofocus assist mode selection fields 440A-C are for inputting three desired values, respectively: 1) a first illumination output level, in this example the illumination output level to which to change the modeling lighting of multifunctional lighting system 208 (FIG. 2) as a function of controller 216 detecting a camera body wake signal; 2) a second illumination output level, here the illumination output level to which to change the modeling lighting of the multifunctional lighting system from the first illumination output level; and 3) a delay value used to determine when to cause the second illumination output level change. In this example, illumination output levels are expressed as a percentage of the maximum illumination output and the delay value is expressed in seconds.

If a user selects checkbox 432C indicating Backlight mode 428, a pair of parameter selection checkbox controls 444A-B become active. In this example, Backlight mode 428 has two sub-modes 448A-B. In first sub-mode 448A, the controlled device (here, modeling lighting device 212 (FIG. 2)) is turned on when a user turns on the camera body backlighting and is turned off when the user turns off the camera body backlighting. In second sub-mode 448B, the controlled device is turned off when a user turns on the camera body backlighting and is turned on when the user turns off the camera body backlighting. It is noted that in alternative embodiments each of first and second sub-modes 448A-B may be provided with power level fields similar to the power level fields of Wake and AF Assist modes 420, 424. However, in this example, modeling lighting device 212 (FIG. 2) is either switched on or off, so no power levels need to be set. Rather, the on- and off-signaling from controller 216 to modeling lighting device 212 will be handled properly depending on which sub-mode 448A-B is selected. That is, if first sub-mode 448A is selected, the software application running on laptop computer 404 configures controller 216 to send an on-signal to wireless communications device 260 (FIG. 2) when a user turns on the backlighting of camera body 204 and to send an off signal to that wireless communications device when the user turns off the camera body backlighting. The opposite is true of second sub-mode 448B. In another alternative in which the power state change is binary, i.e., off-on-off or on-off-on, GUI 412 may be provided with two power level fields (not shown) corresponding to the two changes. These fields may be identical to fields 436A-B, 440A-B of, respectively, Wake mode 420 and AF Assist mode 424. Then, if a user wants off-on-off functionality, the user would input 100% power for the first power level change (corresponding to the off-on transition) and 0% power for the second power level change (corresponding to the on-off transition). Of course, other alternatives are possible.

Figure 5A:
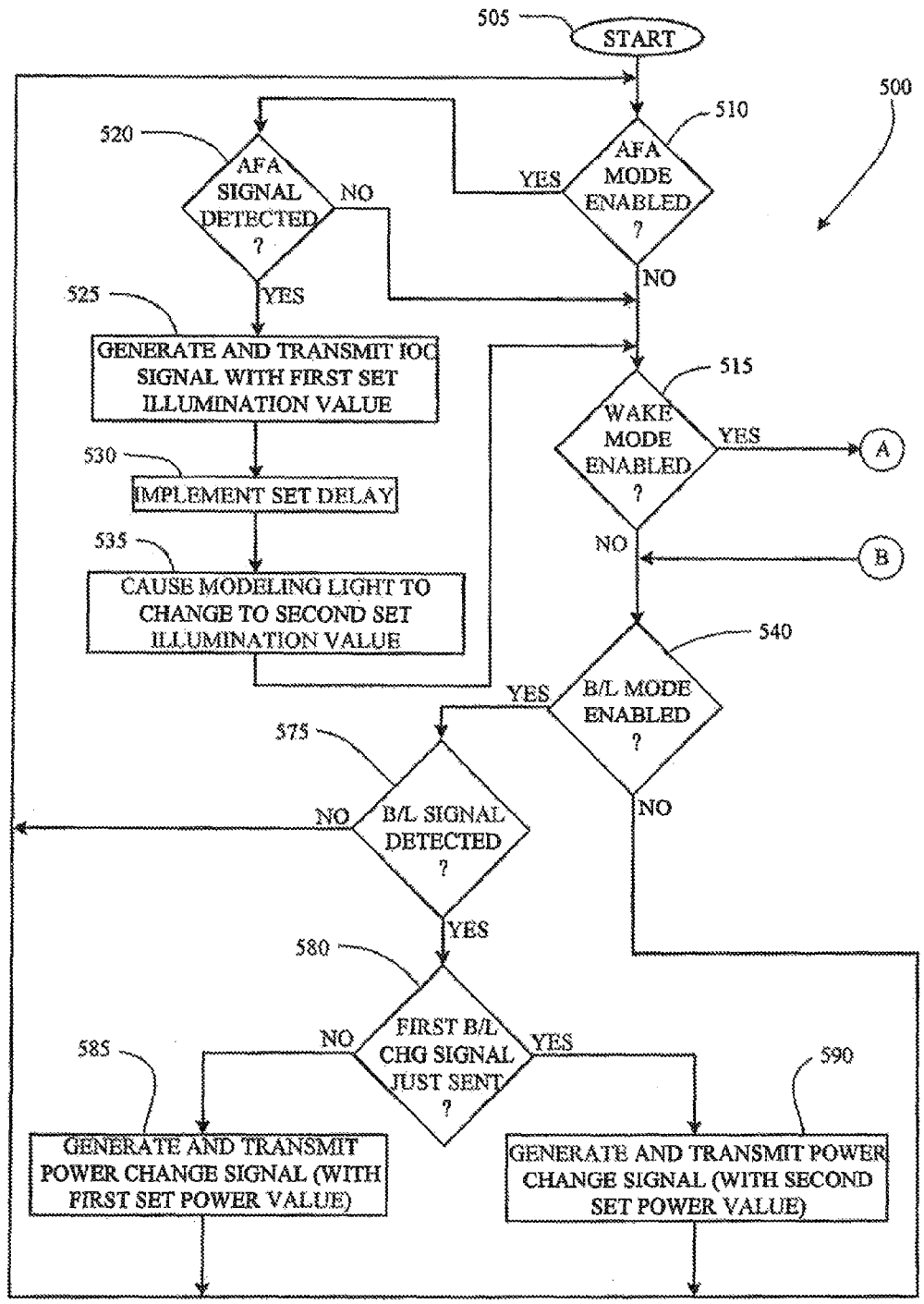
FIGS. 5A-B together contain a flow diagram illustrating a method of controlling the scene illumination output of modeling lighting using a controller having a wake mode, an autofocus assist mode and a backlight mode, such as the controller of FIGS. 2 and 3.
Figure 5B:
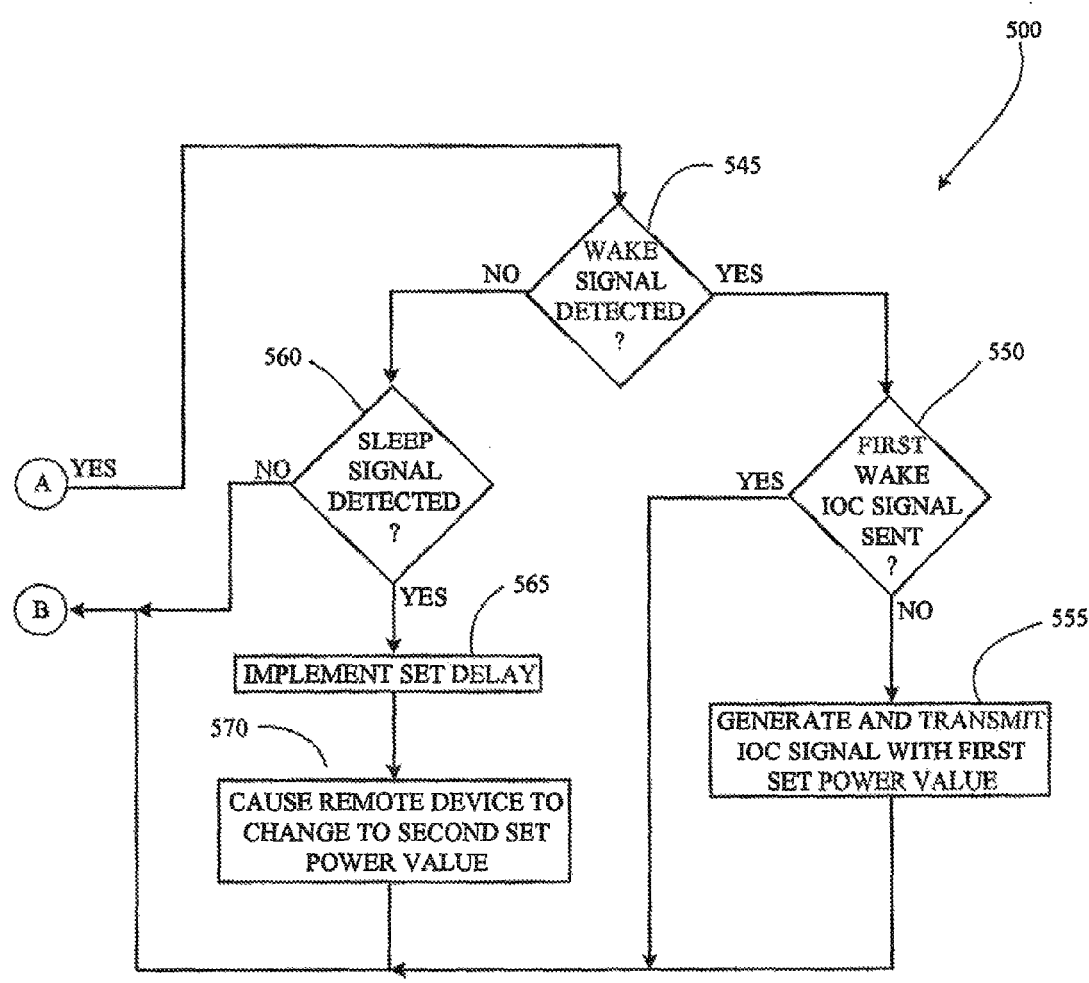

FIGS. 5A-B illustrate a flow diagram illustrating one possible method 500 of controlling controller 216 so as to provide the controller with the functionality illustrated via GUI 412 of FIG. 4. As those skilled in the art will readily appreciate, method 500 can be implemented in software, in analog circuitry and in any combination thereof. At step 505 method 500 begins. Depending on the power state of controller 216, step 505 may begin when the controller is first powered on and, if the controller has wake and sleep states to control power consumption, every time the controller is woken up. At step 510 the controller determines (or already knows) whether or not AF Assist (AFA) mode 424 is enabled. As discussed above relative to GUI 412 (FIG. 4), AF Assist mode 424 may be enabled during an appropriate setup procedure, for example, by a user checking checkbox 432B in the GUI with controller 216 in communication with laptop 404. If AF Assist mode 424 is not enabled, method 500 continues to step 515 wherein controller 216 checks to determine whether Wake mode 420 has been enabled, for example, in a manner similar to AF Assist mode 424.

However, if at step 510 controller 216 determines (or knows) that AF Assist mode 424 is enabled, then method 500 proceeds to step 520 at which the controller determines whether or not it has detected an AFA signal generated by camera body 204 (FIG. 2). If controller 216 has not detected camera body AFA signal, method 500 simply proceeds to step 515 to determine whether Wake mode 420 is enabled. On the other hand, if controller 216 has detected a camera body AFA signal, at step 525 controller 216 generates and transmits an illumination output change signal. In this example, since generator pack 256 (FIG. 2) of multifunction lighting system 208 has built-in wireless communication device 260 and is responsive to instructions containing illumination level settings, step 525 includes transmitting the first change level set in field 436A of GUI 412. In this example, controller 216 transmits the first change level signal as soon as possible after it detects the camera body AFA signal.

At step 530 controller implements the delay set in field 436C of GUI 412. In this example, generator pack 256 has an internal timer and is responsive to wirelessly received instructions that include delay values. Consequently, in one example when controller 216 transmits the IOC signal along with the first illumination level at step 525, at the same time it transmits the set delay value. Those skilled in the art will understand that other implementations can utilize a timer function built into the controller. At step 535, controller 216 causes the modeling light to change to the second change level set in field 436B of GUI 412. In the present example in which generator pack 256 is responsive to a robust instruction set, controller 216 performs step 535 by sending the second change level along with the delay value and first change level that the controller sends at step 525. Generator pack 256 then implements the change of the modeling light of multifunction lighting system 208 to the second change level after the internal timer of the generator pack times-out on the set delay value. If in another implementation controller 216 provides the timer functionality, the controller could send a second IOC signal containing the second change level in response to the timer timing out. Still further options are possible, depending on the particular capabilities of the modeling lighting devices at issue. It is noted that the flow diagram for method 500 does not capture other steps that can be implemented to provide various other operating features that may be needed to provide desired operation. For example, once controller 216 detects a camera body AFA signal at step 520, it may be desirable to disable Wake mode 420 and/or backlight (B/L) mode 428 to prevent the controller from changing the modeling lighting to an illumination output level unsuitable for assisting autofocusing.

After controller 216 performs step 535, example method 500 proceeds to step 515 at which the controller determines (or knows) whether or not Wake mode 420 is enabled. If Wake mode 420 is not enabled, method 500 proceeds to step 540 at which controller 216 determines (or knows) Backlight (B/L) mode 428 is enabled. However, if Wake mode 420 is enabled (step 515), at step 545 controller 216 determines whether or not it detects a camera body wake signal. In this example (as seen further below in connection with FIG. 7), the camera body wake signal is an analog signal indicated by an intermediate-level rise in a line voltage on the first pin of hotshoe 220 (FIG. 2). (In this example, a high level rise in that line voltage indicates the presence of an AFA signal (see FIG. 7 and accompanying description.) When this line voltage is at the intermediate-level voltage, the camera body wake signal is said to be present. Correspondingly, a drop in the line voltage from the intermediate-level voltage corresponds to a sleep signal.

If controller 216 detects a camera body wake signal at step 545, method 500 proceeds to step 550, which in this example is implemented because the method is set up to continually loop through the various branches of the method. At step 550, controller 216 determines whether or not it has already sent a first IOC signal based upon an earlier recognition that the camera body wake signal was high (in this example, at the intermediate-level voltage). If controller 216 has not already sent such first IOC signal, method 500 proceeds to step 555, wherein the controller generates and transmits that first IOC signal. As will be seen below relative to FIG. 7, in this example, step 555 essentially causes the modeling lighting of multifunction lighting system 208 to change almost instantaneously after the leading edge of the line voltage begins to rise toward the intermediate level. In this example, the sending of the first IOC signal at step 555 includes sending to wireless communications device 260 (FIG. 2) of generator pack 256 the first change level noted in field 440A of GUI 412. After controller 216 sends the first IOC signal at step 555, method 500 proceeds to step 540 so as to continue the looping. If at step 550 controller 216 determines that the first IOC signal from step 555 was sent previously since the current camera body wake signal became present, method 500 proceeds to step 540 and continues the continual looping.

If at step 545 controller 216 did not detect a wake signal, then method 500 proceeds to step 560 at which the controller detects whether a camera body sleep signal has occurred. If a camera sleep signal has not occurred, method 500 proceeds to step 540 to continue the looping nature of the method. In this example, the user-set delay value present in field 440C of GUI 412 (FIG. 4) is implemented relative to the camera body sleep signal. Since wireless communication device 260 includes a built-in timer, when controller 216 detects a camera body sleep signal at step 560 it proceeds to step 565 in which it implements the set delay value from field 440C. In this example, controller 216 accomplishes step 565 by transmitting to wireless controller a second IOC signal that includes the second change level setting set in field 440B of GUI 412, along with a set-timer instruction and the delay value set in field 440C of GUI 412. At step 570 controller 216 causes the modeling lighting of multifunction lighting system 208 to change to the second change level set in field 440B of GUI 412. Again, controller 216 performs step 570 by way of the transmitting of the set delay value to wireless communications device 260 at the same time as the second change level setting. Generator pack 256 then changes the illumination output level of the modeling lighting to the second change level when the timer in second wireless communications device times out on the delay. In other embodiments, steps 565 and 570 can be handled differently. For example, if controller 216 were to have the timer functionality, step 565 could involve the controller setting the timer, and step 570 could involve the controller transmitting the second change level upon timing out of the timer. Of course, other possibilities exist. It is noted, too, that the delay could be initiated, for example, from the initial wake signal detection rather than the sleep signal detection. After controller has performed steps 565, 570, method 500 loops back to step 540.

In another variation in which wireless communications device 260 at generator pack 256 includes a built-in timer to handle the delay values set in fields 436C, 440C of GUI 412, this communications device may be augmented with additional timer functionality to account for instances where either camera body 204 never generates, in this example, a sleep signal (such as when a user turns the camera body off while it is still awake) or controller 216 never transmits a second IOC signal (such as when a user turns off the controller before detecting a sleep signal and/or transmitting the second IOC) or a receiver failing to receive a second IOC signal, for example, because of interference between the transmitter and receiver. In such a case, wireless communications device 260 can include a second timer that is reset with a delay value (herein called an "inactivity delay value") each time it receives a first IOC signal. This inactivity delay value will typically be stored in wireless communications device 260 and should be a value greater than any reasonably anticipated value for either of the delay values set in fields 436C, 440C of GUI 412 (FIG. 4). In one example, the inactivity delay value is set to 10 minutes, though many other values may be used.

In conjunction with the inactivity delay value, wireless communications device 260 may also be programmed with a inactivity illumination output value setting that the wireless communications device can load into generator pack 256 if the wireless communications device's timer times out on the inactivity delay value, for example, if it never receives a second IOC signal in the normal course of method 500. Again, this can happen in this example if camera body 204 never generates a sleep signal and/or controller 216 never transmits a second IOC signal, among other events. The inactivity illumination output value setting may be the same as, or different from, either or both of the illumination output value settings in fields 436B, 440B of GUI 412.

At step 540, if controller 216 detects (or knows) that Backlight (B/L) mode 428 (FIG. 4) is not enabled, method 500 simply loops back to step 510. However, if Backlight mode 428 is enabled, at step 575 controller 216 determines whether or not a camera body B/L signal (e.g., either an on or off signal) has occurred. If not, method 500 simply loops back to step 510. However, if controller 216 detects a camera body B/L signal at step 575, it proceeds to step 580 to determine whether or not it has already sent a first IOC signal at step 585 to modeling lighting device 212 (FIG. 2), in this case simply a toggling signal. If controller 216 determines it has not sent the first IOC signal, method 500 proceeds to step 585 and sends that signal. It is noted that if modeling lighting device 212 were so enabled to respond to transmitted first and second change levels, the transmission of the relevant signaling at step 585 could include such a level value. After controller 216 generates and transmits an IOC signal at step 585, method 500 loops back to step 510. If, however, at step 580 controller 216 determines that it has already sent a first IOC signal (e.g., in response to a user turning camera body backlighting on), method 500 proceeds to step 590 at which the controller generates and transmits a second IOC signal (here, simply another toggle signal), for example, in response to the user turning the camera backlighting off. After controller 216 generates and transmits an IOC signal at step 590, method 500 loops back to step 510. It is noted that as with additional optional steps of method 500 relating to AF Assist mode 424, various additional optional steps may be added relative to Wake and Backlight modes 420, 428. For example, various disabling steps and/or interrupt steps may be added to disable certain functionality and/or to allow ones of the various modes to interrupt one another. Those skilled in the art will readily understand how to implement the illustrated and other steps using well known programming and/or circuit design techniques.

Figure 6:
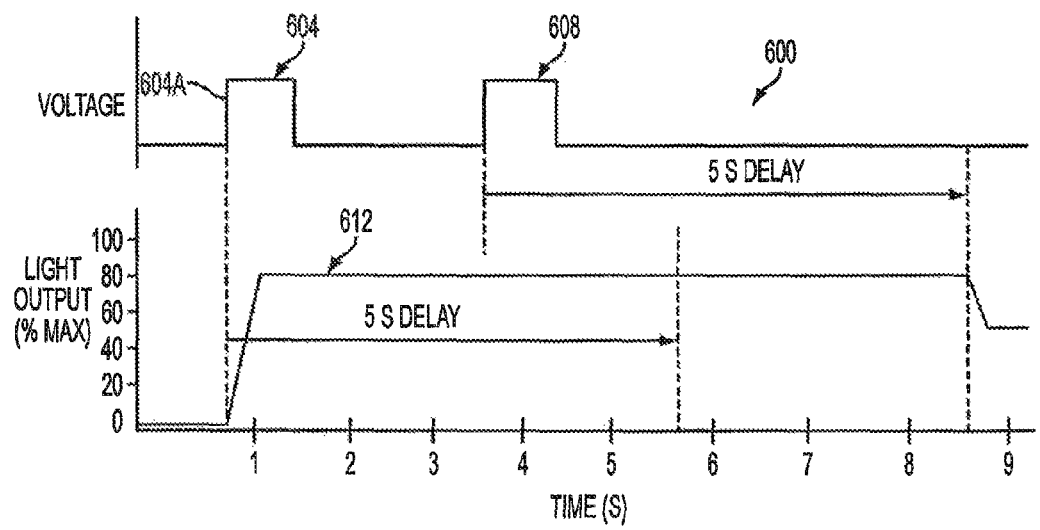
FIG. 6 is an example timing diagram illustrating functioning of the autofocus assist mode of a wireless controller, such as the controller of FIGS. 2 and 3, using the control settings illustrated on the screen of the graphical user interface of FIG. 4.
Figure 7:
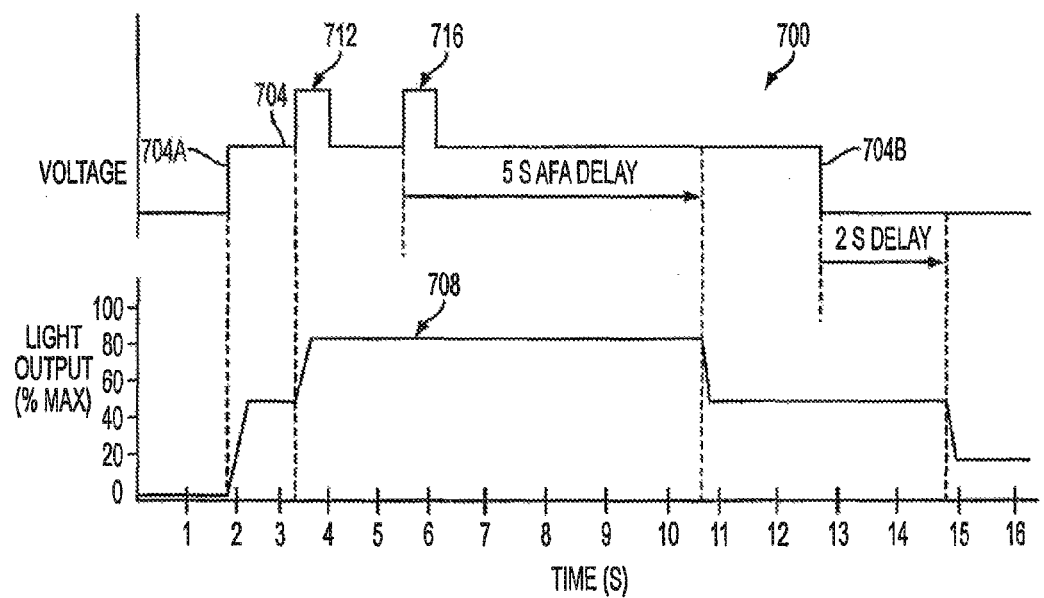
FIG. 7 is an example timing diagram illustrating functioning of the wakeup mode of a controller, such as the controller of FIGS. 2 and 3, using the control settings illustrated on the screen of the graphical user interface of FIG. 4.
Figure 8:
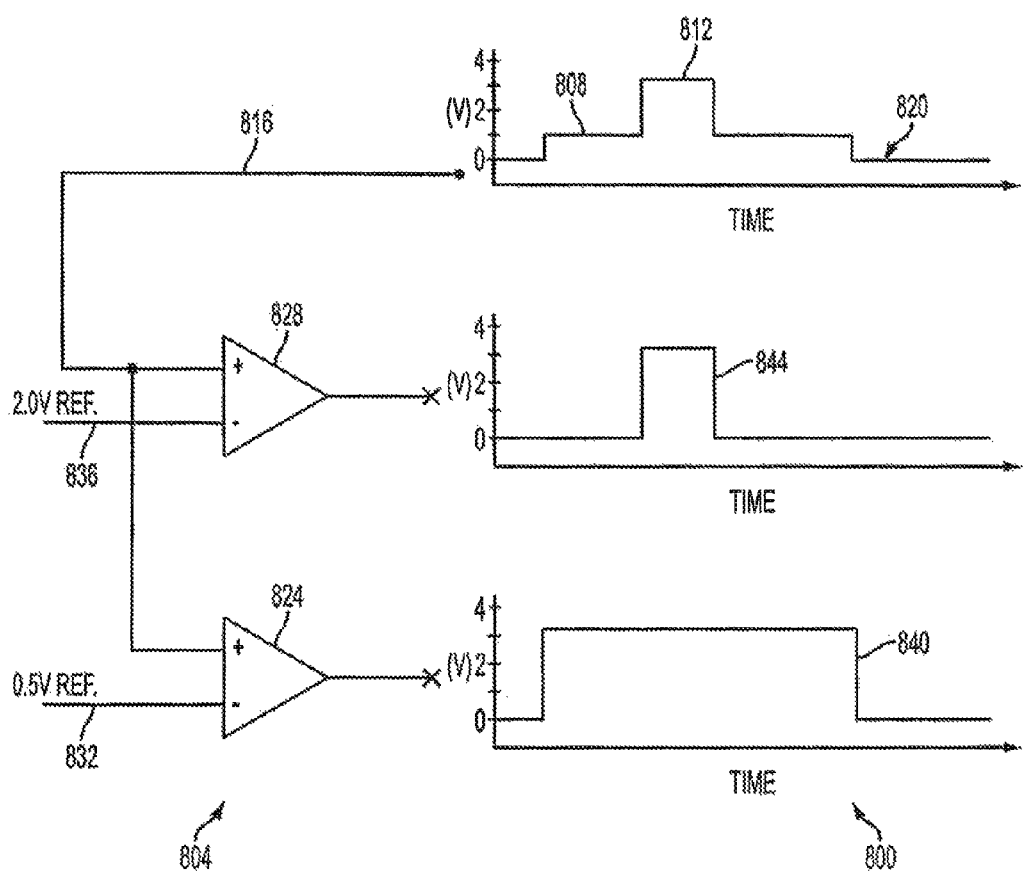
FIG. 8 is a diagram illustrating circuitry and corresponding signaling suitable for use in the camera body interface of a controller, such as the controller of FIGS. 2 and 3.

Referring now to FIGS. 6-8, and also to FIGS. 2 and 4, FIGS. 6-8 illustrate example timing diagrams 600, 700, 800 for scenarios involving ones of the Wake and AF Assist modes 420, 424 (FIG. 4). As mentioned above, these diagrams 600, 700, 800 are for a camera body, such as camera body 204 of FIG. 2, that communicates wake and autofocus assist signals via common hotshoe contacts as analog voltage signals, as opposed to digital data packet signals. That said, as mentioned above those skilled in the art could readily implement the same sort of control scheme in a digital instruction signaling environment that uses digital packet signal analogs to the analog voltage signals. In timing diagrams 600, 700, the settings for Wake mode 420 are: first power change level=50%; second power change level=15%; delay=2 seconds, and the settings for AF Assist mode 424 are: first power change level=80%; second power change level=60%; delay=5 seconds. These settings are shown on screen 416 of FIG. 4.

Referring to FIGS. 2, 4 and 6, timing diagram 600 of FIG. 6 is an example in which only AF Assist mode 424 is enabled. In this example, camera body 204 (FIG. 1) has generated first and second AFA signals 604, 608 approximately 2 seconds apart from one another. Camera body 204 may generate each AFA signal 604, 608 in any number of ways, such as in an automatic mode in response to a user performing a half-press on shutter release button 224 of the camera body or in response to the user pressing a dedicated AFA button 228 of the camera body. When wireless controller 216 first detects the leading edge 604A of first AFA signal 604, in this example, it generates and transmits a modeling light instruction (set) containing the first power change level, the second power change level and the delay values set, for example, via GUI 412 of FIG. 4. Once generator pack 256 receives this instruction (set), as represented by modeling light illumination output curve 612 it changes the output level of the modeling light to the first power change level (here, 80%) from whatever level the modeling light was set to prior to receiving the instruction (set) (here, 0%) and starts a delay timer (not shown) internal to the modeling light using the preset delay value (here, 5 seconds).

If controller 216 does not detect another AFA signal in about 5 seconds from detecting first AFA signal 604, i.e., in about the time of the delay value, the built-in timer of wireless communications device 260 will time-out and this wireless device will initiate via generator pack 256 the second power level change of the modeling light to the preset level (here, 60%). However, in the case illustrated in FIG. 6, within about 2 seconds of detecting first AFA signal 604, controller 216 detects second AFA signal 608, which in this example causes the controller to send the same instruction (set) it sent in response to the detection of the first AFA signal. When wireless communications device 260 receives this second instruction (set), it initiates the first power level change (which is not actually a change since the first power change level had already been set in response to first AFA signal 604) of the modeling light and re-sets its internal timer to the preset delay value. Since in this example controller 216 does not detect another AFA signal within about 5 seconds (again, the preset delay) of second AFA signal 608, after the built-in timer of wireless communications device 260 times out, as seen by modeling light illumination output curve 612, this communications device initiates the second power change and changes the modeling light output level to the second power change level (here, 60%).

Referring now to FIGS. 2, 4 and 7, timing diagram 700 of FIG. 7 is an example for a scenario in which both Wake and AF Assist modes 420, 424 are enabled. In this example, when the controller 216 detects a leading edge 704A of a wake signal 704, it generates and transmits a modeling light instruction (set) that contains the first power change level. When wireless communications device 260 receives that instruction (set), as illustrated by modeling light illumination output curve 708, it changes via generator pack 256 the modeling light output level from whatever level it was previously set to (here 10%) to the first power change level (here, 50%). As seen from timing diagram 700, while camera body 204 remains awake (and correspondingly, wake signal 704 remains high), the camera body generates first and second AFA signals 712, 716, in this example 1.5 seconds apart from one another. When controller 216 detects the leading edge 712A of first AFA signal 712, it generates and transmits a modeling light instruction (set) in a manner essentially the same as described above relative to FIG. 6. This instruction (set) includes the first power change level, the second power change level and the delay for the AF Assist mode (here, respectively, 80%, 60%, 5 seconds). Upon receiving such instruction (set), as seen by modeling light illumination output curve 708, generator pack 256 changes its modeling light power output to 80% and sets its internal timer to 5 seconds.

Like the example of FIG. 6, if controller 216 does not detect another AFA signal in about 5 seconds from detecting first AFA signal, i.e., about the time of the AF Assist mode delay value, the built-in timer of wireless communications device 260 will time-out and will cause generator pack 256 to make the second power level change to the preset level (here, 60%). However, in the scenario illustrated in FIG. 7, within about 1.5 seconds of detecting first AFA signal 712, controller 216 detects second AFA signal 716, which in this example causes the controller to send the same instruction (set) it sent in response to the detection of first AFA signal. When wireless communications device 260 receives this second instruction (set), as seen by modeling light illumination output curve 708, it initiates via generator pack 256 the first modeling light power level change (which is not actually a change since the first power change level had already been set in response to first AFA signal 712) and re-sets the communications device's timer to the preset delay value. Since in this example controller 216 does not detect another AFA signal within about 5 seconds (again, the preset delay) of second AFA signal 512, after the built-in timer of wireless communications device 260 times out, as seen by modeling light illumination output curve 508, the communications device initiates the second power change and changes the output level of the modeling light to the second power change level (here, 60%).

In this example, after the timer internal to wireless communications device 260 has timed out from second AFA signal 716, camera body 204 is still awake for a few seconds, as indicated by wake signal 704 still being high. Camera body 204 may remain awake, for example, because a user continues to hold shutter release button 224 at half-press. However, once controller 216 detects the trailing edge 704B of wakeup signal 704 (i.e., a sleep signal), it generates and transmits to wireless communications device 260 a modeling light instruction (set) containing the wakeup mode second power change level (here, 15%) and the wake mode delay (here, 2 seconds). When wireless communications device 260 receives this instruction (set), it sets its internal delay timer to 2 seconds. When the internal timer times out, as seen by modeling light illumination output curve 708, wireless communications device 260 causes generator pack 256 to change its modeling light output level from the current level (here, the 60% level from the second power change of AF Assist mode 424) to the second power change level (here, 15%). As described above, if controller 216 is so enabled, after this last transmission it may enter a sleep mode to save power.

FIG. 8 illustrates example circuitry 804 that may be used in, for example, camera body interface 308 (FIG. 3) of controller 216 (FIGS. 2 and 3) to convert "raw" camera body wake and AFA signals 808, 812 available, in this example, at hotshoe 220 of camera body 204 to signals suitable for use in microprocessor 300 of the controller. In the context of example circuitry 804, camera body wake and AFA signals 808, 812 are of the same analog character as the like signals 604, 608, 704, 712, 716 of FIGS. 6 and 7, above. More precisely, in this example, wake signal 808 is characterized by a rise in voltage from a low voltage (here, 0V) to a midlevel voltage (here, 1V), and autofocus signal 812 is characterized by a rise in voltage from the midlevel voltage to a high voltage (here, 3.5V).

Circuitry 804 includes an input 816 that carries an input voltage signal 820 that contains wake and AFA signals 808, 812 when they occur. Input 816 is electrically coupled to inputs of corresponding respective first and second comparators 824, 828 that each compare input voltage signal 820 to a particular reference voltage on a corresponding reference voltage line 832, 836. Here, the reference voltage for first comparator 824 is 0.5V, which allows the first comparator to output a wake-signal-present signal 840 when wake signal 808 is present on input 816. Similarly, the reference voltage for second comparator 828 is 2V, which allows the second comparator to output an AFA-signal-present signal 844 when AFA signal 812 is present on input 816. In this example, wake-signal-present and AFA-signal-present signals 840, 844 are provided as inputs to microprocessor 300 (FIG. 3). If the I/O voltage regime of microprocessor 300 is 0V to 3.3V, then the wakeup-signal-present and AFA-signal-present signals 840, 844 output from comparators 824, 828 are either about 0V or about 3.3V, depending on whether corresponding wake and AFA signals 808, 812 are present on input voltage signal 820. Of course, those skilled in the art will readily appreciate that other circuitry may be used.

While the foregoing example is directed to an analog signaling scheme, those skilled in the art would readily be able to implement control concepts of the present disclosure in a digital signaling scheme where a camera body communicates various state and control information internally and/or externally using digitally encoded information. In addition, it is noted that while the foregoing example is directed to a controller located externally relative to a camera body, as mentioned above a controller of the same, like or other control functionality can be built into a camera body. A potential advantage of building a controller implementing broad concepts of the present disclosure into a camera body is that a greater variety of camera body signals would likely be available, since typically only a subset of the signals generated by a camera body are normally available externally to a camera body through various ports on the camera body.

Figure 9:
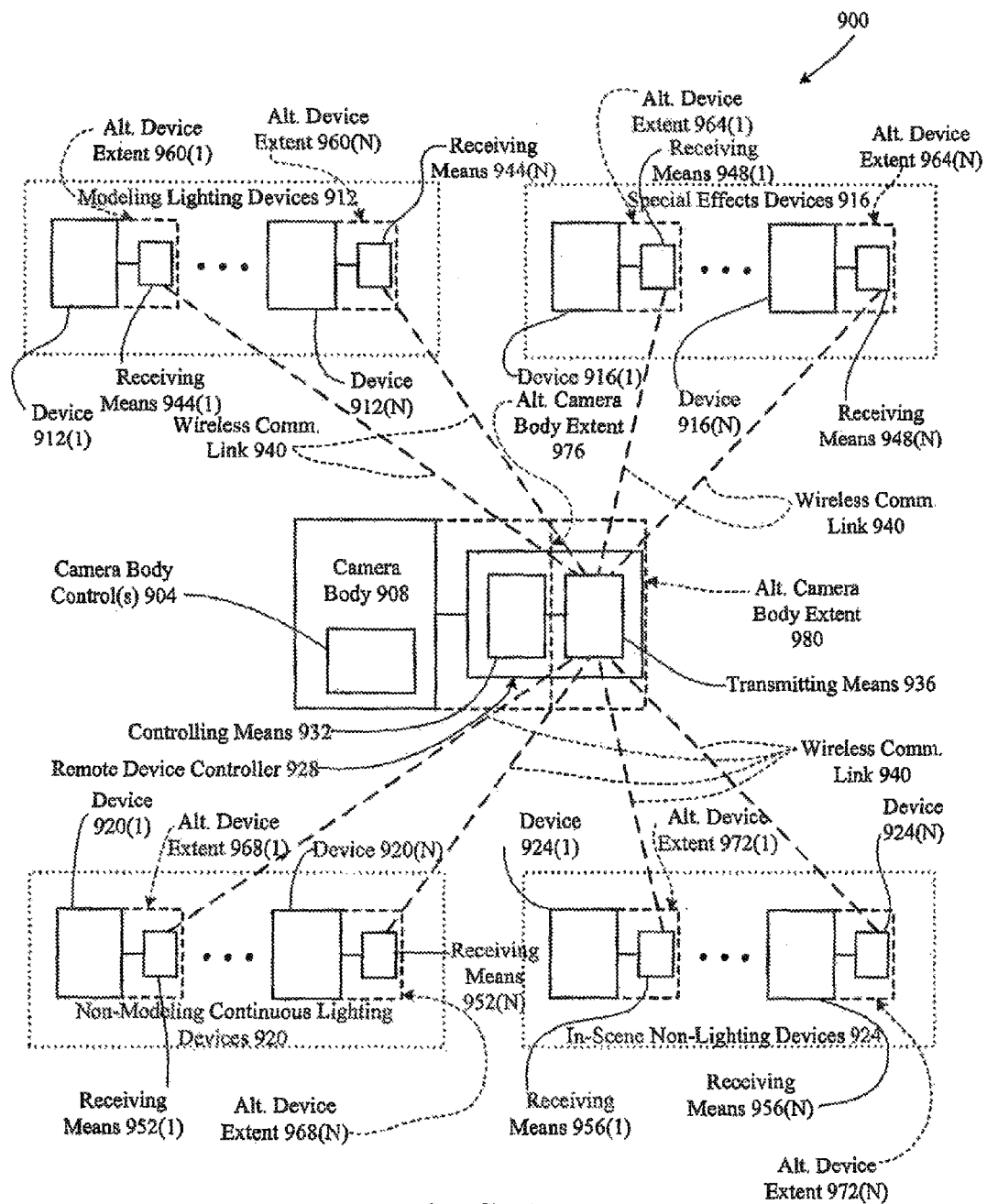
FIG. 9 is a high-level diagram illustrating a flexible control system for controlling a host of devices, including modeling lighting devices, special effects devices, non-modeling continuous lighting devices and in-scene non-lighting devices, using one or more camera body controls of a camera body.

While FIGS. 2-8 are directed specifically to controlling modeling lighting devices, methods incorporating broad concepts disclosed herein, such as method 100 of FIG. 1, can be used to control virtually any type of controllable device. FIG. 9 generally illustrates this concept. FIG. 9 illustrates diagrammatically a flexible system 900 that allows a photographer to control any one or more of a myriad of devices of any one or more types using one or more camera body controls 904 located on a camera body 908. In this example, devices that are controllable include modeling lighting devices 912 (912(1)-(N)) (which may be similar to modeling lighting apparatuses 208, 212 of FIG. 2), special effects devices 916 (916(1)-(N)) (such as a fan, a snow shaker, a misting device, a fogger, a rain maker, a sprayer, etc.), non-modeling continuous lighting devices 920 (920(1)-(N)) (such as ambient lighting (e.g., general studio/room lighting), in-scene lighting (e.g., electric lamps, etc.) and in-scene non-lighting devices 924 (924(1)-(N)) (such as a motorized train set, magnetic actuator, etc.). As those skilled in the art will appreciate, the general steps illustrated in method 100 of FIG. 1 can be used to control any one or more of controlled devices 912, 916, 920, 924 singly or in various combinations with one another, as described in more detail below.

To enable the remote control functionality, system 900 includes a remote device controller 928 that issues one or more appropriate power state control signals to one or more of controlled devices 912, 916, 920, 924. To accomplish this, remote device controller 928 includes a controlling means 932 and a transmitting means 936. Controlling means 932 detects the one or more camera body signals designated for controlling the one or more controlled devices 912, 916, 920, 924 and, in response thereto, generates the appropriate signal(s) and any corresponding information, such as device identifier(s) for identifying the particular device(s) for receiving the signal(s). Controlling means 932 can be implemented in any of a variety of ways in a manner similar to controller 216 discussed above relative to FIGS. 2-8. These ways include: a microprocessor and software (firmware) combination; a microprocessor, software and hard circuitry combination; and hard circuitry alone. Those skilled in the art will readily understand how to implement any of these ways when confronted with particular camera body signaling and other design parameters. The signals generated by controlling means will have any of a variety of configurations, depending on the robustness of the signaling the relevant ones of controlled devices 912, 916, 920, 924 are designed to handle. Such signaling ranges, for example, from a simple toggling signal to signals that include power state settings for the first and second power state change, delay settings and device identification codes.

Transmitting means 936 transmits the signal(s) generated by controlling means 932 via wireless communications "links" 940 to corresponding respective ones of controlled devices 912(1)-(N), 916(1)-(N), 920(1)-(N), 924(1)-(N) via corresponding respective receiving means 944(1)-(N), 948(1)-(N), 952(1)-(N), 956(1)-(N). Transmitting and receiving means 936, 944(1)-(N), 948(1)-(N), 952(1)-(N), 956(1)-(N) can utilize any suitable communications mode, such as wireless RF communications (in which case wireless communications links 940 will be wireless RF links), wireless optical (infrared (IR), visible) communications (in which case wireless communications links 940 will be wireless optical links), etc. In the case of wireless RF communications, transmitting means 936 may be an RF transmitter or RF transceiver and each receiving means 944(1)-(N), 948(1)-(N), 952(1)-(N), 956(1)-(N) may be an RF receiver or RF transceiver. In the case of wireless optical communications, transmitting means 936 may be, for example, an IR transmitter (transceiver) or a visible light transmitter (e.g., flash lighting strobe) (transceiver), and each corresponding receiving means 944(1)-(N), 948(1)-(N), 952(1)-(N), 956(1)-(N) may be an IR receiver (transceiver) or visible light receiver (transceiver). Those skilled in the art will readily understand how to implement the desired communications mode as needed to suit a particular design.

Each controlled device 912(1)-(N), 916(1)-(N), 920(1)-(N), 924(1)-(N) shown in FIG. 9 is shown as having a corresponding alternative device extent 960(1)-(N), 964(1)-(N), 968(1)-(N), 972(1)-(N) to indicate that the corresponding receiving means 944(1)-(N), 948(1)-(N), 952(1)-(N), 956(1)-(N) can be located essentially internally relative to that controlled device rather than externally ("essentially" being used to indicate that one or more parts of the receiving means, such as antenna, optical sensor, etc., may be located externally). For example, any one of receiving means 944(1)-(N), 948(1)-(N), 952(1)-(N), 956(1)-(N) may be built into the corresponding controlled device 912(1)-(N), 916(1)-(N), 920(1)-(N), 924(1)-(N) or may be provided as an aftermarket solution.

Similarly, camera body 908 is shown as having differing alternative extents 976, 980 to show that remote device controller 928 and various parts thereof can be located either internally or externally relative to the camera body, depending on the particular design at issue. For example, when camera body 908 excludes the entirety of remote device controller 928, the controller may be a hotshoe mountable device, such as shown with controller 216 of FIGS. 2 and 3. However, in alternative embodiments, one or both of controlling means 932 and transmitting means 936 may be included within camera body 908. In an example of the former, controlling means 932 may be implemented in the onboard microprocessor (not shown) of camera body 908 and transmitting means 936 implemented in an external accessory RF transmitter. In an example of the latter, controlling means 932 may be implemented in the onboard microprocessor (not shown) of camera body 908 and transmitting means 936 implemented in an onboard transmitter provided in the camera body, for example, at the time of manufacture.

Regardless of how remote device controller 928 is configured relative to camera body 908, it may readily be configured to perform methods of the present disclosure, such as method 100 of FIG. 1. For example, remote device controller 928 may be configured to have the same or similar functionality as described above relative to controller 216 in connection with FIGS. 2-8, including the programmability illustrated relative to FIG. 4 and the signaling and functioning illustrated relative to FIGS. 5-8. In this connection, it is noted that the functionality of controller 216 described above relative to FIGS. 2-8 is specific to modeling lighting. However, those skilled in the art will understand that the illumination output levels and control of modeling lighting devices 208, 212 are readily translatable into power state levels and control of non-modeling lighting devices, such as special effects devices 916, non-modeling continuous lighting devices 920 and in-scene non-lighting devices 924.

Figure 10:
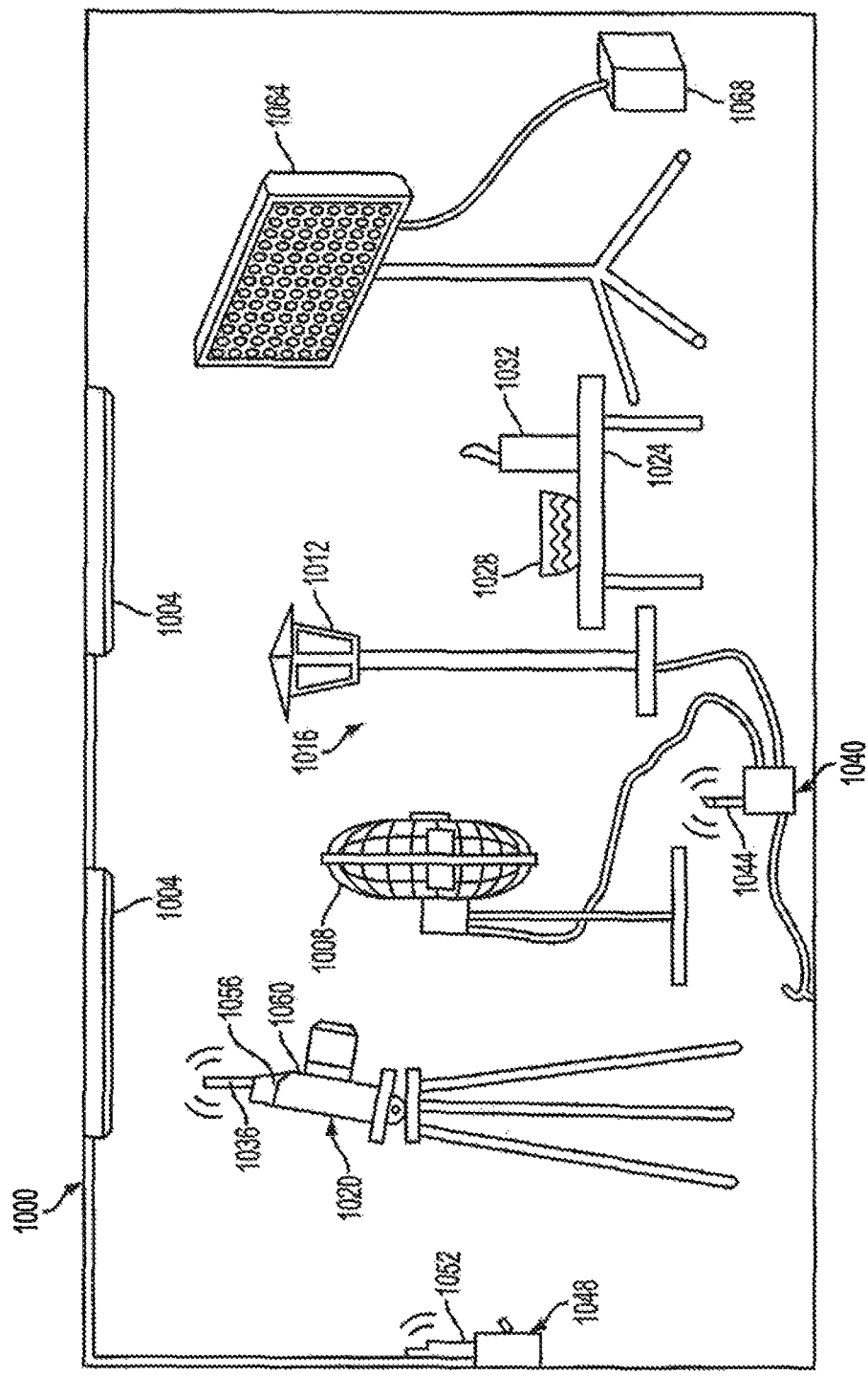
FIG. 10 is an elevational view of a photography studio containing a photographic system that includes a camera, ambient lighting devices and an in-scene lighting device, wherein the system is configured to allow a photographer to control operation of the ambient lighting devices and in-scene lighting device using the body of the camera.

For example, FIG. 10 illustrates a scenario within a photography studio 1000 in which a remote device controller (not shown, but the same as or similar to remote device controller 928 of FIG. 9) is used to control non-modeling lighting devices, specifically, general studio lighting devices 1004, a special effects fan 1008 and an in-scene lighting device, i.e., a post lamp 1012. In this example, the remote device controller is configured in a manner similar to controller 216 of FIGS. 1 and 2, has settings similar to the settings shown in GUI 412 of FIG. 4, and performs the steps of method 500 of FIGS. 5A-B at least with respect to Wake mode 420 and Backlight mode 428 (FIG. 4). In particular and as described below in more detail, Wake mode 420 is used to control both fan 1008 and post lamp 1012, and Backlight mode 428 is used to control studio lighting devices 1004.

Studio 1000 contains a scene 1016 to be photographed using a camera body 1020. In this example, scene 1016 includes post lamp 1012, a table 1024, a bowl 1028 and a lit candle 1032 resting on the table. Scene 1016 is to be a very dimly lit scene, with the only light to be present when images are being captured by camera body 1020 during the image-acquisition phase being low levels of light from post light 1012 and from lit candle 1032. Light levels during image acquisition are to be so low that any ambient lighting other than light from post light 1012 and lit candle 1032 must be extinguished. Also during image capture, fan 1008 is used to create a gentle breeze so as to cause lit candle 1032 to flicker slightly.

In this example, the remote device controller is built into camera body 1020 and includes an RF transmitter (not shown, but evidenced by antenna 1036 on the camera body). As mentioned, both fan 1008 and post light 1012 are being controlled using Wake mode 420 (FIG. 4). Here, a single power controller 1040, which includes a built-in RF receiver (not shown, but evidenced by antenna 1044), is used to control both fan 1008 and post light 1012 by varying the electrical power provided to those devices. Power controller 1040, in this example, includes a built-in timer (not shown) and is configured to be responsive to wireless signals containing power state change settings and a delay value in a manner similar to the modeling light of multifunctional lighting system 208 of FIG. 8. Consequently, when the remote device controller detects a wake signal, it generates and transmits a signal that contains 1) the power state for power controller 1040 to change fan 1008 and post light 1012 to upon receipt of the signal, 2) the power state for the power controller to change the fan and post light to when the delay times-out, and 3) the delay value. These correspond to the values set in fields 436A-C of GUI 412 of FIG. 4. Note that in the present case, the values for fields 436A-C are, respectively, 10%, 0% and 20 seconds. That is, the power states of fan 1008 and post light 1012 are very low upon the first power state change and are off after the expiration of the 20 second delay. The 20 second delay gives the photographer about a 20 second window for capturing images.

As mentioned above, studio lighting devices 1004 are controlled using Backlight mode 428 (FIG. 4), and during image capturing it is desired that the studio lighting be turned off. To facilitate this, studio 1000 includes a special switch 1048 that can be toggled on and off under wireless control. Consequently, switch 1048 includes a wireless receiver (not shown, but evidenced by antenna 1052). Referring to FIG. 4, sub-mode 444B of Backlight mode 428 is selected in this example so that when the camera body backlighting is turned on, switch 1048, and hence studio lighting devices 1004, are turned off. Then, when a photographer is ready to acquire one or more images of scene 1016 under low-level lighting conditions, the photographer simply needs to turn the camera backlighting on, for example, using a backlighting control switch 1056 on camera body 1020. The photographer may do this at any desired time, for example, after he/she turns on fan 1008 and post light 1012, which can be accomplished by actuating a partial-press of a shutter-release button 1060 on camera body 1020. As described above, a partial-press typically causes a camera body, such as camera body 1020 to generate a camera body wake signal, which the remote device controller aboard the camera body then uses to perform the process of controlling fan 1008 and post light 1012 via power controller 1040. Those skilled in the art will readily understand that this example is merely illustrative and in no way should be construed as limiting. There are many ways of controlling studio lighting devices 1004, fan 1008, post light 1012 and other devices using the broad concepts disclosed herein.

Studio 1000 of FIG. 10 also includes an LED-array modeling lighting device 1064, which, in this example is powered by a battery pack 1068. Modeling lighting device 1064 can be controlled using any suitable one of the control schemes disclosed herein for controlling remote devices, such as the control schemes described above or devised in the spirit of the specifically disclosed control schemes and the present disclosure. An advantage of implementing such a control scheme in connection with LED-array modeling lighting device 1064, other than the sheer ease, is that the device can be controlled to be turned on and/or adjusted to the appropriate power level substantially only when its light is needed, thereby reducing the power drain on battery pack. When such control schemes are utilized with other modeling lighting devices, and other light devices generally, these control schemes can greatly reduce usage of those devices, thereby extending the time between replacements of burned-out light bulbs. This can result in significant cost savings in replacement bulbs over time.

Figure 11:
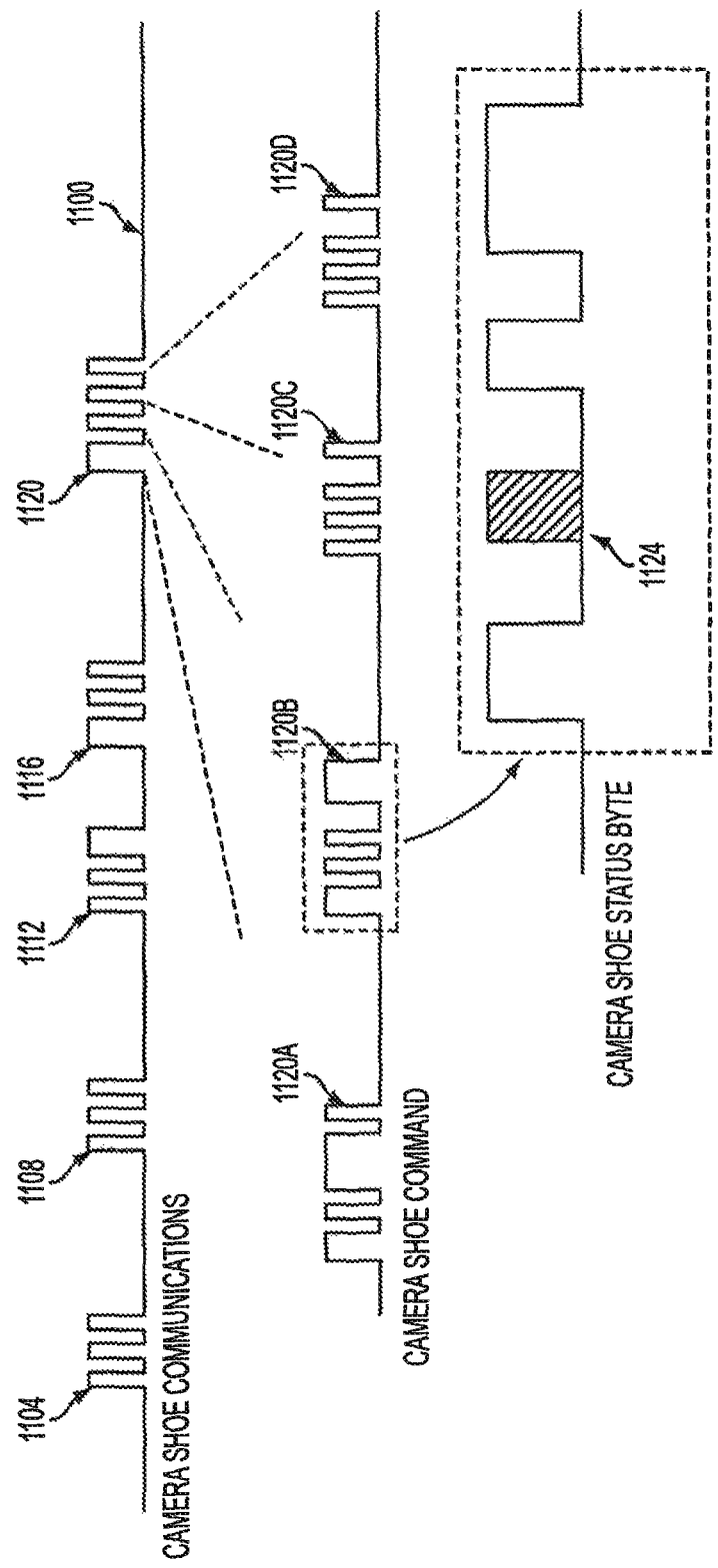
FIG. 11 is a diagram illustrating a digital camera-body-status communication signal containing autofocus assist and backlight information that a controller of the present disclosure can use to control one or more modeling lighting device(s)

As mentioned above, remote-device control functionality disclosed herein can be implemented regardless of whether the camera body signal(s) utilized is/are analog signals or digital signals. The examples of FIGS. 6-8, above, are directed to utilizing analog AF assist and backlighting control signals of a corresponding camera body that generates such signals to achieve the described exemplary remote-device control functionality. For the sake of completeness, FIG. 11 illustrates a digital camera-body-status communication signal 1100 that generally includes digital equivalents to the AF assist and backlighting signals discussed above. In this example, when the camera body is awake the camera body continually broadcasts camera-body/flash status and settings information via communication signal 1100 in the form of digital data bursts, here 1104, 1108, 1112, 1116, 1120 that each contain, for example, 12 to 24 bytes of status information, bits of which indicates statuses of various camera-body/flash status and settings. In this example, FIG. 11 shows four bytes 1120A-D of such 12 to 24 bytes of burst 1120, and one of these bytes, i.e., byte 1120B, contains a status bit 1124 of interest. In this example, status bit 1124 is a bit that indicates whether or not the backlight is on, with a high value (1) indicating on and a low value (0) indicating off. Byte 1120B or other byte of any one of the data bursts can also include a status bit indicating that an AF-assist request has been made. The same is true for many other camera-body signals, such as a red-eye-reduction signal, among others. When the camera-body signals being utilized for remote-device control functionality, the corresponding controller, for example, the digital counterpart to controller 216 of FIG. 2, can be configured to monitor communications signal 1100 for the bit(s) of interests, for example, using digital signal monitoring techniques known in the art. Once the controller detects the desired signal(s) it can implement the desired remote-device control functionality, for example, any one or more of the functionalities described herein.

Figure 12:
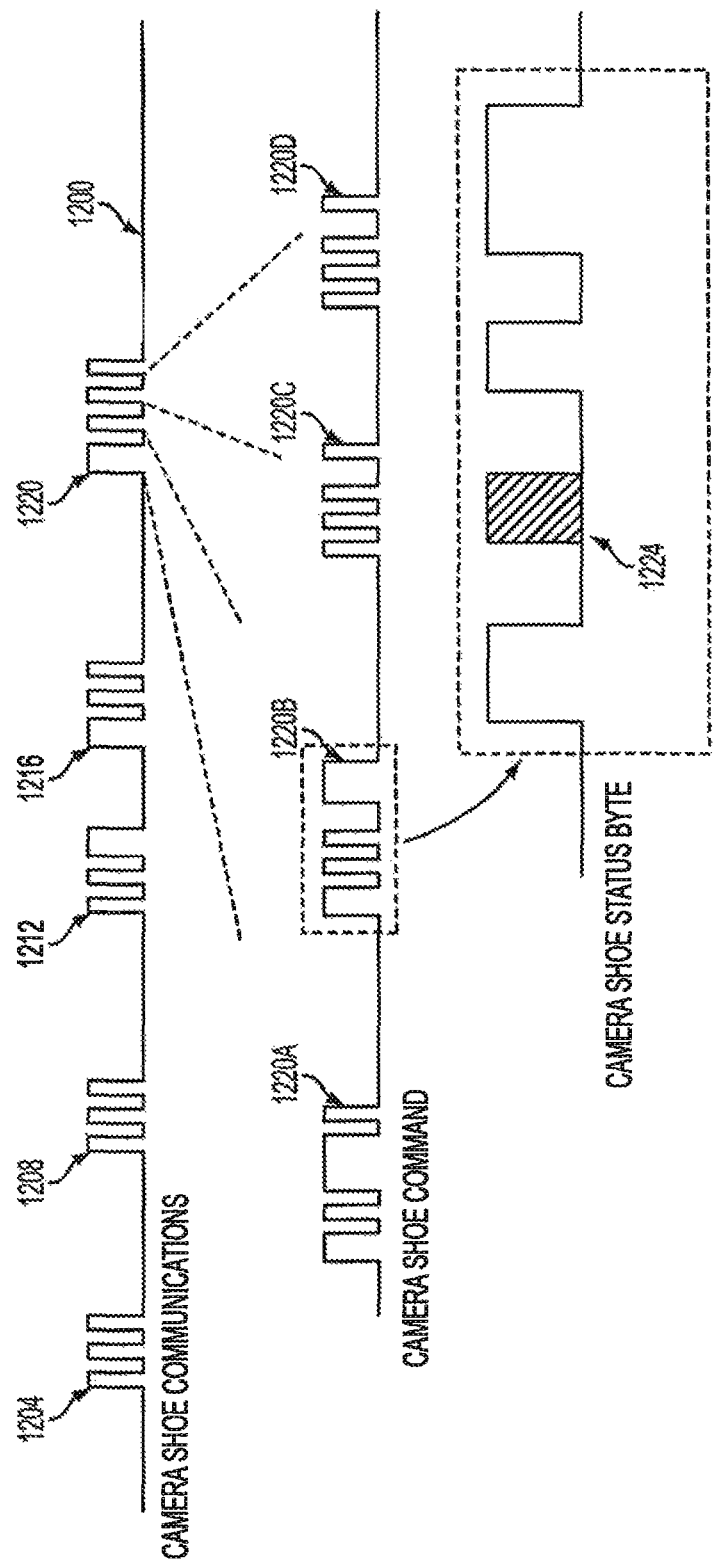
FIG. 12 is an example timing diagram illustrating the control of one or more remote devices in a manner that synchronizes a remote device to image capture.

In addition to the foregoing examples, FIG. 12 illustrates the use of a camera-body event, such as a pre-flash request or any other early indication of impending image capture, to synchronize one or more in-scene events with image capture so that the in-scene event(s) occur at precisely the right time to be captured in an image. Examples of such in-scene events include, but are not limited to, the detonating of an explosive charge, the firing of a bullet, the turning off of a modeling light, the activating of a fuel injector spray, the dropping of a water droplet, among many others. A benefit of such functionality can include the use of faster shutter speeds without concern for missing an in-scene event.

An example of this remote device synchronization functionality is described in connection with FIG. 12, which is an example timing diagram 1200 showing the timing of various signals, events and time delay. This example is based on a camera body that generates a digital camera-body-status communications signal, such as signal 1100 of FIG. 11, that contains periodic data bursts that communicate, among other things, status data on the states of various signals and events occurring within the camera body. In FIG. 12, this camera-body-status communications signal is denoted hotshoe data signal 1204, since it is available at the hotshoe of the camera body, for example, hotshoe 220 of camera body 204 of FIG. 2.

In this example, the remote device controller (not shown) is a hotshoe-mounted device that is the same as controller 216 of FIG. 2, except that the present controller is responsive to digital signal 1204 rather than to the analog-type signals that controller 216 is configured to responds to as described above. Specifically, in this example the remote device controller is responsive to a particular event 1204A represented on digital signal 1204 that indicates a particular camera-body event has occurred that is known to occur an exact amount of time prior to the shutter of the camera body opening. In one example, this event is the occurrence of a set-flash-power-level signal. In current Nikon DSLR bodies this set-flash-power-level event 1204A is known to occur between 25 ms and 90 ms before the shutter opens, depending on which camera body model is at issue. This time difference is the same for every image-captured on a given camera body model. As described below in greater detail, the remote-device controller is configured to detect event 1204A and, in response thereto, transmit an initiate-timer signal 1208 that begins the synchronization of the in-scene event with the capturing of an image that includes the in-scene event.

In the embodiment illustrated by timing diagram 1200, the remote device controller also transmits a shutter-opened signal 1212 and a shutter-closed signal 1216. In this example, the remote-device controller generates shutter opened signal 1212 as a function of its detection of event 1204A and the known camera-body-model-specific delay between that event and the opening of the shutter. The remote-device controller generates shutter-closed signal 1216 in response to the trailing edge 1220A of an X-sync signal 1220 that is also available on the hotshoe. Also in this embodiment, the remote device, for example, any one of devices 912, 916, 920, 924, that is controlled by the remote-device controller includes or is otherwise in communication with a receiver, such as any one of receiving means 944, 948, 952, 956, that includes a delay timer that executes a predetermined delay 1224 (FIG. 12) before activating the remote device. FIG. 12 also includes an in-scene event control signal 1228 that controls when state changes occur within the remote device under control of the remote-device controller. Like many image-capture scenarios, the image in this example is captured using synchronized flash lighting device (not shown) responsive to a wireless flash sync signal 1232.

With the components of timing diagram 1200 introduced, the synchronization of an in-scene event proceeds as follows. First, a photographer performs a full-press on the shutter release button (or performs some other shutter-releasing function) to initiate the capturing of an image. This is not represented in FIG. 12, but occurs at some point prior to event 1204A, which occurs in response to such a shutter release event. In addition to generating event 1204A, the camera body also generates X-sync signal 1220 at some known fixed time after generating event 1204A. In response to detecting event 1204A, the remote-device controller generates and transmits, almost immediately, initiate-timer signal 1208 that starts the timer in the remote-device receiver. The timer then executes predetermined delay 1224 that, in this case, controls the time that the remote device changes state. In this example, predetermined delay 1224 is set to perform a first state-change 1228A that changes the state of the remote device just prior to the start of image-capture, which occurs at leading edge 1220A of X-sync signal 1220. In a digital camera, the time between leading and trailing edges 1220A-B of X-sync signal 1220 correspond to the integration period, i.e., the time period the image sensor is exposed to light from the scene being photographed. In other cases, predetermined delay 1224 can be adjusted so that the state change occurs exactly at the opening of the shutter or at some time after the opening of the shutter, but before the shutter is closed.

Depending on the nature of the remote device being triggered, the remote device only needs to have one state change, such as in the case of the firing of a bullet or the detonating of an explosive. However, in other cases, such as in controlling the spray of a fuel injector, it is desired to perform a second state-change 1228B that changes the state of the remote device a second time, for example, to turn-off a device that was started by the first state change. In this example, second state-change 1228B is performed in response to shutter-closed signal 1216 transmitted by the transmitter of the remote-device controller. As with first state-change 1228A, second state-change 1228B does not necessarily have to be activated using shutter-closed signal 1216 or occur after the shutter has closed. For example, second state-change 1228B could occur in response to shutter-opened signal 1212 with or without a timer delay. Those skilled in the art will readily appreciate that this is simply one example of many variants that those skilled in the art could devise using the present disclosure as a guide. It is virtually impossible to detail all such variations that will occur to those skilled in the art without undue experimentation.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of changing power states of a remote lighting device using a camera body, comprising:
    detecting at least one first camera body signal that is generated as a function of a user actuation of at least one camera body control;
    generating a first power level signal in response to said detecting of the at least one first camera body signal, the first power level signal including data representing a first power output level for the remote lighting device;
    wirelessly transmitting the first power level signal so as to cause the remote lighting device to operate at the first power output level;
    implementing a preset delay; and
    causing the remote lighting device to change from the first power output level to a second non-zero power output level different from the first power output level in response to expiration of the preset delay.

2. A method according to claim 1, wherein said detecting of the at least one first camera body signal includes detecting a camera body wake signal and said generating of the first power level signal includes generating the first power level signal in response to said detecting of the camera body wake signal.

3. A method according to claim 2, wherein the camera body has a hotshoe and said detecting of the camera body wake signal includes detecting the camera body wake signal via the hotshoe.

4. A method according to claim 1, wherein said detecting of the at least one first camera body signal includes detecting a camera body autofocus assist signal and said generating of the first power level signal includes generating the first power level signal in response to said detecting of the camera body autofocus assist signal.

5. A method according to claim 4, wherein the camera body has a hotshoe and said detecting of the camera body autofocus assist signal includes detecting the camera body autofocus assist signal via the hotshoe.

6. A method according to claim 1, wherein said detecting of the at least one first camera body signal includes detecting at least one camera body signal that is generated by the camera body in response to a partial pressing of a shutter release control.

7. A method according to claim 6, wherein said detecting of the at least one first camera body signal includes detecting a camera body wake signal.

8. A method according to claim 6, wherein said detecting of the at least one first camera body signal includes detecting a camera body autofocus assist signal.

9. A method according to claim 1, wherein said detecting of the at least one first camera body signal includes detecting a camera body depth-of-field preview signal and said generating of the first power level signal includes generating the first power level signal in response to said detecting of the camera body depth-of-field preview signal.

10. A method according to claim 9, wherein the camera body has a hotshoe and said detecting of the camera depth-of-field preview signal includes detecting the camera body depth-of-field preview signal via the hotshoe.

11. A method according to claim 9, wherein said detecting of the at least one camera body signal includes detecting at least one camera body signal that is generated by the camera body in response to a user actuation of a depth-of-field preview button.

12. A method according to claim 1, wherein said implementing the preset delay includes starting a delay timer in response to said detecting of the at least one first camera body signal.

13. A method according to claim 1, further comprising detecting at least one second camera body signal, wherein said implementing of the preset delay includes setting a delay timer in response to said detecting of the at least one second camera body signal.

14. A method according to claim 13, wherein said detecting of the at least one second camera body signal includes detecting a camera body sleep signal and said implementing of the preset delay includes setting the delay timer in response to said detecting of the camera body sleep signal.

15. A method according to claim 14, further comprising transmitting a second power level change setting in response to said detecting of the at least one second camera body signal.

16. A method according to claim 13, further comprising:
    generating a second power level signal in response to said detecting of the at least one second camera body signal; and
    transmitting the second power level signal along with the preset delay in response to said detecting of the at least one second camera body signal.

17. A system for changing power states of a remote lighting device using a camera body, comprising:
    a means for detecting at least one first camera body signal that is generated as a function of a user actuation of at least one camera body control;
    a means for generating a first power level signal in response to said detecting of the at least one first camera body signal, the first power level signal including data representing a first power output level for the remote lighting device;
    a means for wirelessly transmitting the first power level signal so as to cause the remote lighting device to operate at the first power output level;
    a means for implementing a preset delay; and
    a means for causing the remote lighting device to change from the first power output level to a second non-zero power output level different from the first power output level in response to expiration of the preset delay.

18. A system according to claim 17, wherein said means for detecting of the at least one first camera body signal includes a means for detecting a camera body wake signal and said means for generating of the first power level signal includes a means for generating the first power level signal in response to said detecting of the camera body wake signal.

19. A system according to claim 18, wherein the camera body has a hotshoe and said means for detecting of the camera body wake signal includes a means for detecting the camera body wake signal via the hotshoe.

20. A system according to claim 17, wherein said means for detecting of the at least one first camera body signal includes a means for detecting a camera body autofocus assist signal and said means for generating of the first power level signal includes a means for generating the first power level signal in response to said detecting of the camera body autofocus assist signal.

21. A system according to claim 20, wherein the camera body has a hotshoe and said means for detecting of the camera body autofocus assist signal includes a means for detecting the camera body autofocus assist signal via the hotshoe.

22. A system according to claim 17, wherein said means for detecting of the at least one first camera body signal includes a means for detecting at least one camera body signal that is generated by the camera body in response to a partial pressing of a shutter release control.

23. A system according to claim 22, wherein said means for detecting of the at least one first camera body signal includes a means for detecting a camera body wake signal.

24. A system according to claim 22, wherein said means for detecting of the at least one first camera body signal includes a means for detecting a camera body autofocus assist signal.

25. A system according to claim 17, wherein said a means for detecting of the at least one first camera body signal includes a means for detecting a camera body depth-of-field preview signal and said means for generating of the first power level signal includes a means for generating the first power level signal in response to said detecting of the camera body depth-of-field preview signal.

26. A system according to claim 25, wherein the camera body has a hotshoe and said means for detecting of the camera depth-of-field preview signal includes a means for detecting the camera body depth-of-field preview signal via the hotshoe.

27. A system according to claim 25, wherein said means for detecting of the at least one camera body signal includes a means for detecting at least one camera body signal that is generated by the camera body in response to a user actuation of a depth-of-field preview button.

28. A system according to claim 17, wherein said means for implementing the preset delay includes a means for starting a delay timer in response to said detecting of the at least one first camera body signal.

29. A system according to claim 17, further comprising a means for detecting at least one second camera body signal, wherein said means for implementing of the preset delay includes a means for setting a delay timer in response to said detecting of the at least one second camera body signal.

30. A system according to claim 29, wherein said means for detecting of the at least one second camera body signal includes a means for detecting a camera body sleep signal and said means for implementing of the preset delay includes a means for setting the delay timer in response to said detecting of the camera body sleep signal.

31. A system according to claim 30, further comprising a means for transmitting a second power level change setting in response to said detecting of the at least one second camera body signal.

32. A system according to claim 29, further comprising:

a means for generating a second power level signal in response to said detecting of the at least one second camera body signal; and a means for transmitting the second power level signal along with the preset delay in response to said detecting of the at least one second camera body signal.

33. A machine-readable hardware storage medium containing machine-executable instructions for performing a method of changing power states of a remote lighting device using a camera body, the machine-executable instructions comprising:

a set of machine-executable instructions for implementing detection of at least one first camera body signal that is generated as a function of a user actuation of at least one camera body control;

a set of machine-executable instructions for generating a first power level signal in response to the detection of the at least one first camera body signal;

a set of machine-executable instructions for initiating transmitting of the first power level signal so as to cause the remote lighting device to operate at a first power state;

a set of machine-executable instructions for implementing a preset delay; and a set of machine-executable instructions for causing the remote lighting device to change from the first power state to a second non-zero power state different from the first power state in response to expiration of the preset delay.

* * * * *